(12) United States Patent
Kuruvilla et al.

(10) Patent No.: US 12,315,017 B2
(45) Date of Patent: *May 27, 2025

(54) SYSTEM AND METHOD FOR ENABLING CAPTURE OF AN IMAGE OF A VEHICLE

(71) Applicant: The Toronto-Dominion Bank, Toronto (CA)

(72) Inventors: Denny Devasia Kuruvilla, Toronto (CA); Esli Gjini, Etobicoke (CA); Sarah Reeve, Toronto (CA); Harjot Singh Panag, Brampton (CA); Justin Seto, Markham (CA); Naomi Sarah Feth, Toronto (CA); Anurag Thakur, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 131 days.

This patent is subject to a terminal disclaimer.

(21) Appl. No.: 18/077,695

(22) Filed: Dec. 8, 2022

(65) Prior Publication Data

US 2023/0110017 A1   Apr. 13, 2023

Related U.S. Application Data

(63) Continuation of application No. 16/152,944, filed on Oct. 5, 2018, now Pat. No. 11,551,307.

(51) Int. Cl.
*H04N 23/63* (2023.01)
*G06F 16/583* (2019.01)
(Continued)

(52) U.S. Cl.
CPC ......... *G06Q 40/08* (2013.01); *G06F 16/5838* (2019.01); *G06T 7/0002* (2013.01);
(Continued)

(58) Field of Classification Search
CPC ... G06Q 40/08; G06F 16/5838; G06T 7/0002; G06T 2207/30248; H04N 23/632; H04N 23/635; H04N 23/64
See application file for complete search history.

(56) References Cited

U.S. PATENT DOCUMENTS 6,608,650 B1   8/2003   Torres et al.
7,924,323 B2   4/2011   Walker et al.
(Continued)

FOREIGN PATENT DOCUMENTS

CN   106709699   5/2017

OTHER PUBLICATIONS

Mikolasek: "Progressive Image Capture: Insurance Quoting of the Future?", https://www.thetruthaboutinsurance.com/progressive-image-capture-insurance-quoting-of-the-future/, dated May 16, 2012.
(Continued)

*Primary Examiner* — Mekonnen D Dagnew
(74) *Attorney, Agent, or Firm* — Rowand LLP

(57) ABSTRACT

Methods and systems for facilitating photo-based estimation are described. In an aspect, a computing device is configured to receive, from the camera, a signal comprising image data. The image data may represent at least a portion of a vehicle. The computing device may also retrieve data representing a preferred scene of the vehicle and determine, based on the image data and based on the data representing the preferred scene of the vehicle, whether the image data corresponds to the preferred scene of the vehicle. The server may, when the received image data corresponds to the preferred scene of the vehicle, enable capture of the image data. The server may send, via the communications module, a signal representing the captured image data to a processing server configured to analyze the captured image data to assess vehicular damage.

14 Claims, 11 Drawing Sheets

(51) Int. Cl.
*G06Q 40/08* (2012.01)
*G06T 7/00* (2017.01)
*H04N 23/60* (2023.01)

(52) U.S. Cl.
CPC ......... *H04N 23/632* (2023.01); *H04N 23/635* (2023.01); *H04N 23/64* (2023.01); *G06T 2207/30248* (2013.01)

(56) References Cited

U.S. PATENT DOCUMENTS

| | | |
|---|---|---|
| 9,232,143 B2 | 1/2016 | Jayaraj et al. |
| 9,607,236 B1 | 3/2017 | Wilbert et al. |
| 9,723,251 B2 | 8/2017 | Slotky |
| 10,163,164 B1 * | 12/2018 | Tofte .................... B64C 39/024 |
| 10,740,891 B1 * | 8/2020 | Chen .................... G06T 7/0008 |
| 2003/0041329 A1 | 2/2003 | Bassett |
| 2008/0030599 A1 | 2/2008 | Stavely et al. |
| 2015/0029346 A1 | 1/2015 | Sieger et al. |
| 2015/0262308 A1 | 9/2015 | Budihal et al. |
| 2016/0189304 A1 | 6/2016 | Todasco |
| 2017/0293894 A1 | 10/2017 | Taliwal et al. |
| 2019/0244301 A1 | 8/2019 | Seth |
| 2020/0027333 A1 | 1/2020 | Xu |
| 2022/0036464 A1 | 2/2022 | Brandmaier |

OTHER PUBLICATIONS

Thomas A. Becker, Ikhlaq Sidhu, and Burghardt Tenderich; Electric Vehicles in United States, Aug. 24, 2009, University of California, Berkeley, No. 2009.1.v.2.0, Revison Date: Aug. 24, 2009.

* cited by examiner

1300

1400

SYSTEM AND METHOD FOR ENABLING CAPTURE OF AN IMAGE OF A VEHICLE

CROSS-REFERENCE TO RELATED APPLICATIONS

The present application is a continuation of patent application Ser. No. 16/152,944, filed Oct. 5, 2018, the contents of which are hereby incorporated by reference.

TECHNICAL FIELD

The present application relates to automated processing of claims and, more particularly, to systems and methods for use with photo-based claim processing.

BACKGROUND

When a party wishes to make an insurance claim, that party may contact an insurer by telephone and the insurer may assign a claims adjuster to the claim. The claims adjuster evaluates the claim. In order to evaluate the claim, the claims adjuster may inspect property, such as a vehicle, that is associated with the claim. The claim adjustment process may take a considerable amount of time and effort.

Computers have sometimes been used to improve the claims process. For example, some insurers may provide a web interface that allows for submission of an online claim form. Typically, online claim submissions are also routed to a claims adjuster. This claim adjustment process may also be time consuming and result in a large delay prior to processing of a claim.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
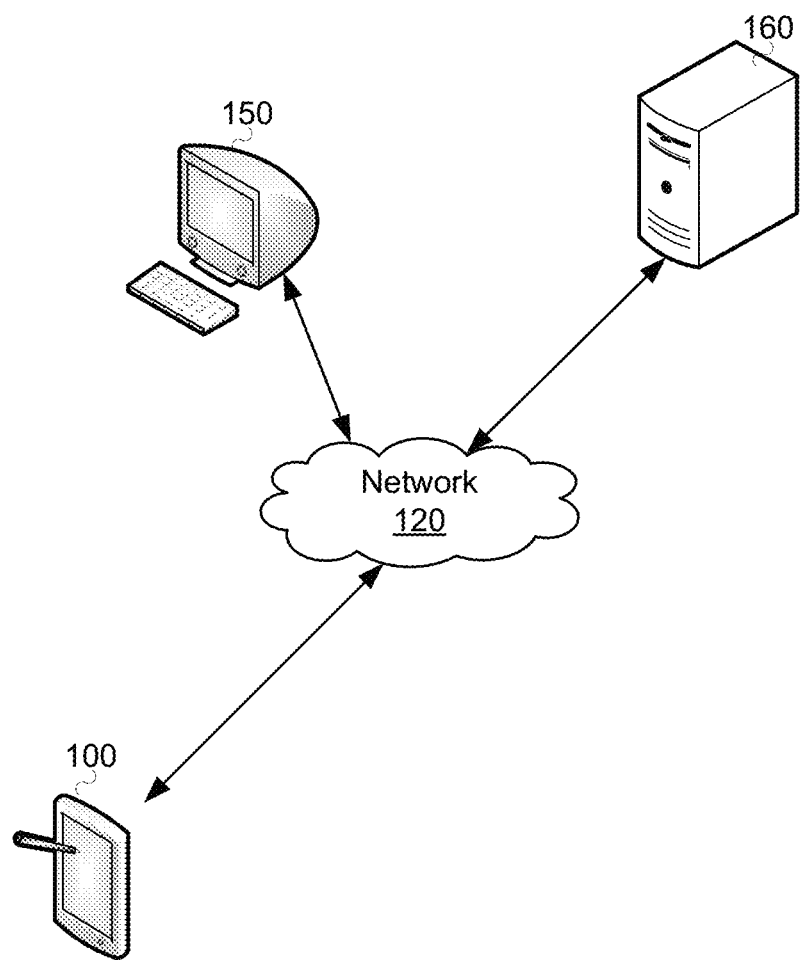
FIG. 1 is a schematic operation diagram illustrating an operating environment of an example embodiment.

According to the subject matter of the present application, there may be provided a server. The server may include a communications module and a data store storing profiles for parties. The server may include a processor coupled to the communications module and the data store and a memory coupled to the processor. The memory may store processor-executable instructions which, when executed by the processor, configure the processor to: receive, via the communications module and from a remote computing device, a signal representing identification data; identify, based on the identification data, one or more of the profiles stored in the data store; obtain a three-dimensional vehicle model based on the identified profile; send, via the communications module to the remote computing device, a second signal representing display data, the display data including the three-dimensional vehicle model and a damage location indicator overlaid on the three-dimensional vehicle model, the damage location indicator selectable to input an indication of a damage location; and receive via the communications module, after selection of the damage location indicator on the remote computing device, a third signal comprising an indicator of the location of damage.

According to a further aspect, there is provided a method. The method may include: receiving, via a communications module and from a remote computing device, a signal representing identification data; identifying, based on the identification data, one or more profiles stored in a data store; obtaining a three-dimensional vehicle model based on the identified profile; sending, via the communications module to the remote computing device, a second signal representing display data, the display data including the three-dimensional vehicle model and a damage location indicator overlaid on the three-dimensional vehicle model, the damage location indicator selectable to input an indication of a damage location; and receiving, via the communications module, after selection of the damage location indicator on the remote computing device, a third signal comprising an indicator of the location of damage. The method may be performed by a computing device.

In a further aspect, there is provided a non-transitory computer readable storage medium comprising computer-executable instructions which, when executed, configure a computing device to: receive, via a communications module and from a remote computing device, a signal representing identification data; identify, based on the identification data, one or more profiles stored in a data store; obtain a three-dimensional vehicle model based on the identified profile; send, via the communications module to the remote computing device, a signal representing display data, the display data including the three-dimensional vehicle model and a damage location indicator overlaid on the three-dimensional vehicle model, the damage location indicator selectable to input an indication of a damage location; and receive via the communications module, after selection of the damage location indicator on the remote computing device, a signal comprising an indicator of the location of damage.

In yet a further aspect, there is provided a server. The server may include a communications module, a data store and a processor coupled to the communications module and the data store. The server may include a memory coupled to the processor. The memory may store processor-executable instructions which, when executed by the processor, configure the processor to: send via the communications module to a remote computing device a first signal comprising a chat interface; receive, via the communications module and from the remote computing device, a second signal representing input received at the remote computing device through the chat interface; identify an account associated with the remote computing device; retrieve policy data associated with the identified account from the data store; automatically evaluate the input and policy data against predetermined criteria to determine whether a claim has a low risk level; and when the claim is determined to have a low risk level, engage a photo-based estimation module, the photo-based estimation module configured to remotely receive an image captured at the remote computing device and provide a real-time estimate based on the received image.

In yet a further aspect, there is described a method that includes: sending, via a communications module to a remote computing device, a first signal comprising a chat interface; receiving, via the communications module and from the remote computing device, a second signal representing input received at the remote computing device through the chat interface; identifying an account associated with the remote computing device; retrieving policy data associated with the identified account from a data store; automatically evaluating the input and policy data against predetermined criteria to determine whether a claim has a low risk level; and when the claim is determined to have a low risk level, engaging a photo-based estimation module, the photo-based estimation module configured to remotely receive an image captured at the remote computing device and provide a real-time estimate based on the received image. The method may be performed by a computing device.

In yet a further aspect, there is described a non-transitory computer readable storage medium comprising computer-executable instructions which, when executed, configure a computing device to: send via a communications module to a remote computing device a first signal comprising a chat interface; receive, via the communications module and from the remote computing device, a second signal representing input received at the remote computing device through the chat interface; identify an account associated with the remote computing device; retrieve policy data associated with the identified account from a data store; automatically evaluate the input and policy data against predetermined criteria to determine whether a claim has a low risk level; and when the claim is determined to have a low risk level, engage a photo-based estimation module, the photo-based estimation module configured to remotely receive an image captured at the remote computing device and provide a real-time estimate based on the received image.

In yet a further aspect, there is described a server that includes a communications module. The server includes a data store storing profiles for parties and a processor coupled to the communications module and the data store. The server further includes a memory coupled to the processor. The memory stores processor-executable instructions which, when executed by the processor, configure the processor to: receive, via the communications module from a remote computing device, a signal comprising image data obtained by the remote computing device through activation of a submission application; obtain verification data, the verification data comprising at least one of policy data obtained from at least one of the stored profiles or sensor data received from the remote computing device; evaluate the image data based on the verification data to determine whether the image data is valid; and upon determining that the image data is not valid, generate an error.

In yet a further aspect there is described a method that includes: receiving, via a communications module from a remote computing device, a signal comprising image data obtained by the remote computing device through activation of a submission application; obtaining verification data, the verification data comprising at least one of policy data obtained from at least one of plurality of stored profiles or sensor data received from the remote computing device; evaluating the image data based on the verification data to determine whether the image data is valid; and upon determining that the image data is not valid, generating an error. The method may be implemented by a computing device.

In yet a further aspect, there is described a non-transitory computer readable storage medium comprising computer-executable instructions which, when executed, configure a computing device to: receive, via a communications module from a remote computing device, a signal comprising image data obtained by the remote computing device through activation of a submission application; obtain verification data, the verification data comprising at least one of policy data obtained from at least one of the stored profiles or sensor data received from the remote computing device; evaluate the image data based on the verification data to determine whether the image data is valid; and upon determining that the image data is not valid, generate an error.

In yet a further aspect, there is described a computing device. The computing device includes a camera and a communications module. The computing device further includes a processor coupled to the camera and the communications module and a memory coupled to the processor. The memory stores processor-executable instructions which, when executed by the processor, configure the processor to: receive, from the camera, a signal comprising image data, the image data representing at least a portion of a vehicle; retrieve data representing a preferred scene of the vehicle; determine, based on the image data and based on the data representing the preferred scene of the vehicle, whether the image data corresponds to the preferred scene of the vehicle; when the received image data corresponds to the preferred scene of the vehicle, enable capture of the image data; and send, via the communications module, a second signal representing the captured image data to a processing server configured to analyze the captured image data to assess vehicular damage.

In yet a further aspect, there is described a method that includes: receiving, from a camera, a signal comprising image data, the image data representing at least a portion of a vehicle; retrieving data representing a preferred scene of the vehicle; determining, based on the image data and based on the data representing the preferred scene of the vehicle, whether the received image data corresponds to the preferred scene of the vehicle; when the received image data corresponds to the preferred scene of the vehicle, enabling capture of the image data; and sending, via a communications module, a second signal representing the captured image data to a processing server configured to analyze the captured image data to assess vehicular damage. The method may be performed by a computing device. In an aspect, a non-transitory computer readable storage medium may include processor-executable instructions which, when executed, configure a processor to perform the method.

In yet a further aspect, there is described a server. The server includes a communications module and a data store storing policy data for a plurality of policies. The server further includes a processor coupled to the communications module and the data store and a memory coupled to the processor and storing processor-executable instructions which, when executed, configure the processor to: receive, via the communications module from a remote computing device, a signal representing a credential; identify, based on the credential, one of the plurality of policies; determine, based on the identified one of the plurality of policies, a vehicle type of an insured vehicle; obtain, from the data store and based on the vehicle type, data representing a preferred scene of the insured vehicle; send, via the communications module and to the remote computing device, the data representing the preferred scene of the vehicle; and receive, from the remote computing device, a second signal comprising image data representing at least a portion of the insured vehicle.

In yet a further aspect, there is described a method that includes: receiving via a communications module from a remote computing device, a signal representing a credential; identifying, based on the credential, one of a plurality of policies; determining, based on the identified one of the plurality of policies, a vehicle type of an insured vehicle; obtaining, from the data store and based on the vehicle type, data representing a preferred scene of the insured vehicle; sending, via the communications module and to the remote computing device, the data representing the preferred scene of the vehicle; and receiving, from the remote computing device, a signal comprising image data representing at least a portion of the insured vehicle. The method may be performed by a computing device. In an aspect, a non-transitory computer readable storage medium may include processor-executable instructions which, when executed, configure a processor to perform the method.

Automated photo-based estimation techniques and may be described herein. For example, a remote computing device, such as a smartphone, may be used to submit a claim to a remote server. During the claim submission, photo-based estimation may be employed to automatically evaluate and process at least some claims. Photo-based estimation allows for automated adjudication of a claim based on image data. More specifically, images may be algorithmically analyzed to quantify an amount of damage to insured property, such as an insured vehicle, and to automatically determine a repair or replacement cost for the insured property.

Conveniently, where photo-based estimation is employed, claim adjustment may be provided automatically and in real time. For example, a processing server may automatically evaluate one or more images associated with a claim in order to quantify an amount of damage to an insured vehicle and may then automatically propose a settlement amount based on the amount of damage.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, a server 160 and a remote computing device 100, such as a smartphone, communicate via a network 120.

The remote computing device 100 and the server 160 may be in geographically disparate locations. Put differently, the remote computing device 100 may be remote from the server 160.

The remote computing device 100 and the server 160 are computer systems. The remote computing device 100 may take a variety of forms including, for example, a mobile communication device such as a smartphone, a tablet computer, a wearable computer such as a head-mounted display or smartwatch, a laptop or desktop computer, or a computing device of another type.

The remote computing device 100 is adapted to present a graphical user interface that allows for remote submission of a claim to the server 160. For example, the remote computing device 100 may be adapted to submit claim information through a chat interface that may be provided on the remote computing device 100. By way of example, the claim information may include one or more photos associated with the claim. The photos may represent a portion of an insured vehicle, for example.

As further described below, the server 160 is adapted to perform automated claim processing of at least some claims. For example, the server 160 may be a claims processing server, which may also be referred to as a processing server, which is configured to selectively perform photo-based estimation. In doing so, the server 160 may receive one or more image of at least a portion of a vehicle and may analyze the image to automatically determine a value associated with a claim. For example, the server 160 may automatically determine an estimate of a repair or replacement cost associated with the claim based on the image(s) and may provide the estimate to the remote computing device 100 for display. Operations associated with the server 160 will be described in greater detail below.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like.

As further explained below, the remote computing device 100 communicates with the server 160 via the network 120 in order to allow for a claim submitted by the remote computing device 100 to be automatically processed by the server 160. That is, in at least some embodiments, the server 160 may process the claim without any human intervention.

As illustrated in FIG. 1, the server 160 and/or the remote computing device 100 may also communicate with an operator device 150. The operator device 150 is or includes a computing device. The operator device 150 is a computer system.

The operator device 150 is adapted to be operated by an operator, who may be a claims processor. In at least some embodiments, the operator device 150 may only be engaged when the server 160 determines that automated claims processing, such as photo-based estimation, is not available. For example, when the server 160 determines that automated claims processing is not available (e.g., if the risk of using photo-based estimation is too high, if images appear to have been tampered with, etc.), it may hand off a chat session between a chat-bot on the server 160 and a user on the remote computing device 100 to the operator device 150 so that an operator may engage in a remote chat with the user via the network 120. When the server 160 hands off the chat session, it may do so unbeknownst to the user. That is, the chat-bot may simply cease operating and the operator may take over seamlessly. To facilitate such handoff, the server 160 may provide the operator device 150 with a chat history when the chat session is handed over to the operator device 150.

Accordingly, the operator device 150 may communicate with one or both of the server 160 and the remote computing device 100 via the network 120.

Figure 2:
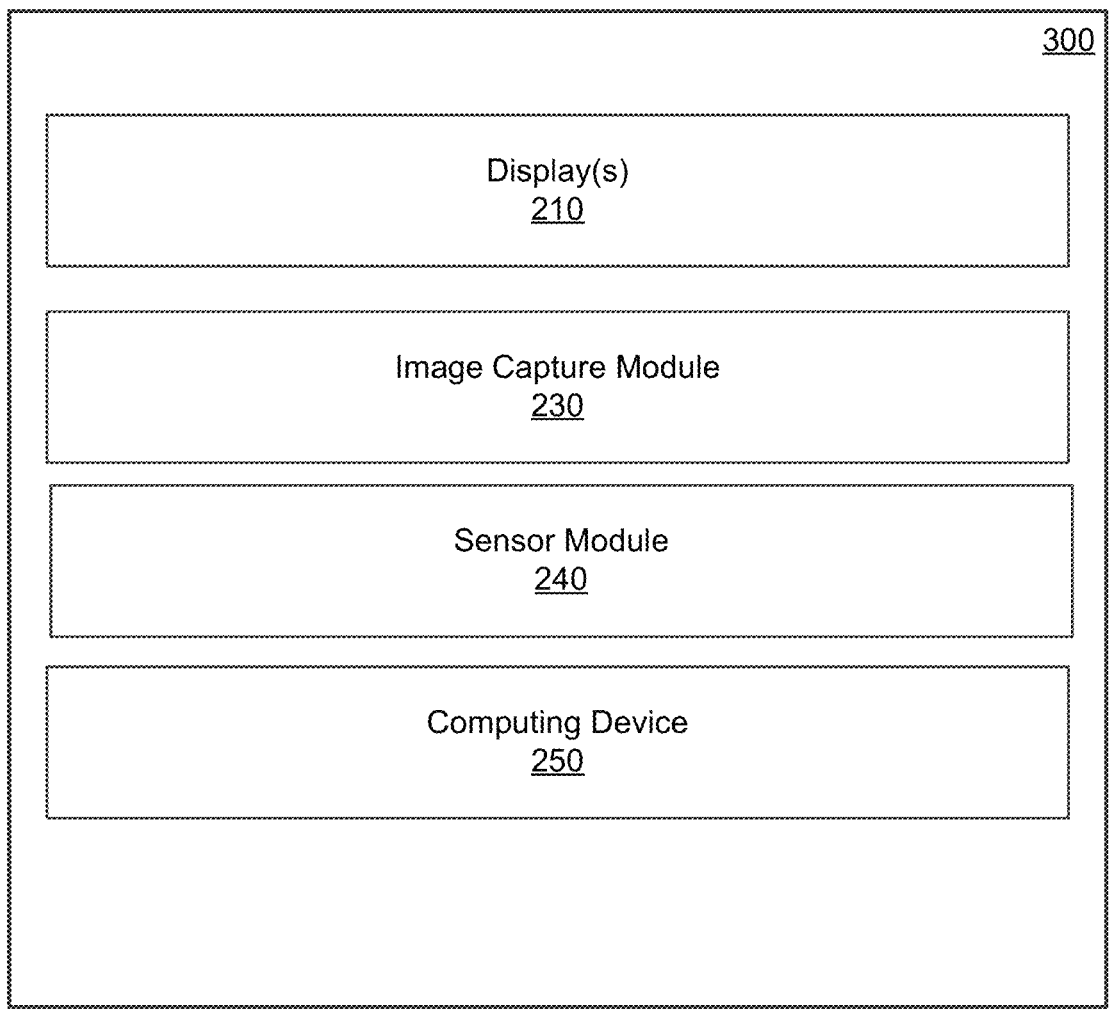
FIG. 2 is a simplified schematic diagram showing components of a computing device.

FIG. 2 is a simplified schematic diagram showing components of the remote computing device 100.

The remote computing device 100 may include modules including, as illustrated, for example, one or more displays 210, an image capture module 230, a sensor module 240, and a computing device 250.

The one or more displays 210 are a display module. The one or more displays 210 are used to display user interface screens that may be used, for example, to submit a claim to the server 160 (FIG. 1). The one or more displays 210 may be internal displays of the remote computing device 100 (e.g., disposed within a body of the remote computing device).

The image capture module 230 may be or may include a camera. The image capture module may be used to obtain image data, such as images. As will be described in greater detail herein, at least some such images may be used for photo-based estimation during processing of a claim. The image capture module 230 may be or may include a digital image sensor system as, for example, a charge coupled device (CCD) or a complementary metal-oxide-semiconductor (CMOS) image sensor.

The image capture module 230 and the display 210 may cooperate in at least one operating mode of the remote computing device 100 to provide a viewfinder. The viewfinder may display camera data obtained via the image capture module 230 in real time or near real time on the display 210.

The sensor module 240 may be a sensor that generates sensor data based on a sensed condition. By way of example, the sensor module 240 may be or include a location subsystem which generates sensor data that is a location. The location may be the current geographic location of the remote computing device 100. The location subsystem may be or include any one or more of a global positioning system (GPS), an inertial navigation system (INS), a wireless (e.g., cellular) triangulation system, a beacon-based location system (such as a Bluetooth low energy beacon system), or a location subsystem of another type.

The computing device 250 is in communication with the one or more displays 210, the image capture module 230, and the sensor module 240. The computing device 250 may be or include a processor which is coupled to the one or more displays 210, the image capture module 230, and/or the sensor module 240

Figure 3:
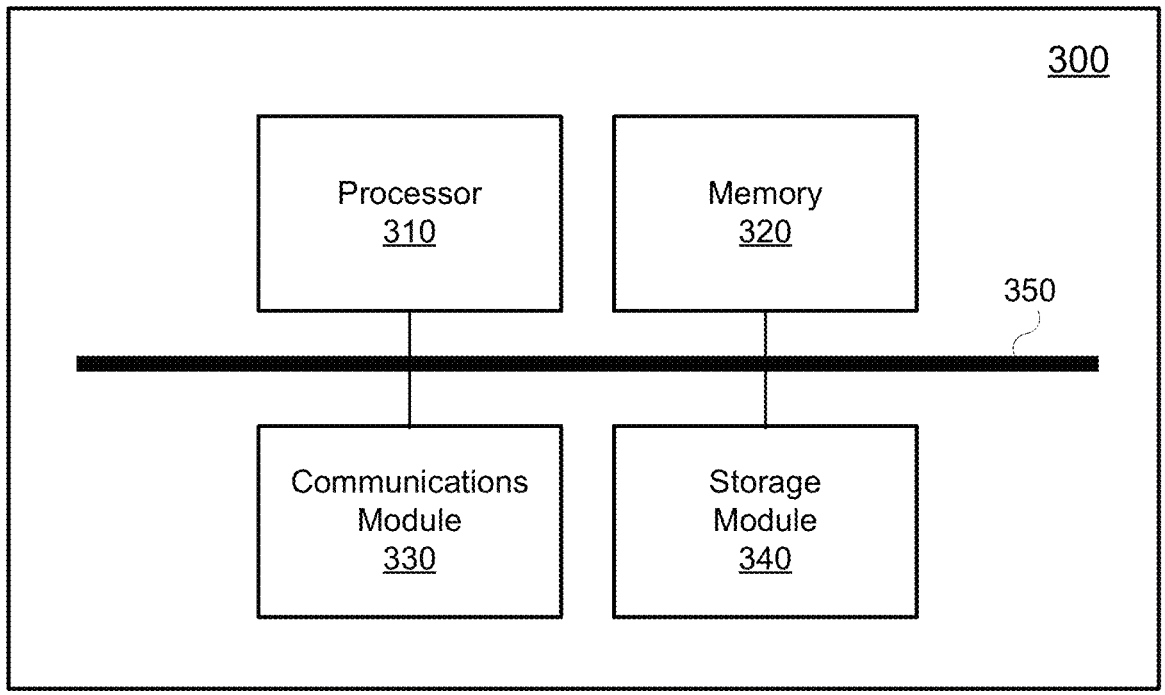
FIG. 3 is high-level schematic diagram of an example computing device.

FIG. 3 is a high-level operation diagram of an example computing device 300. In some embodiments, the example computing device 300 may be exemplary of the computing device 250 (FIG. 2) and/or the server 160 (FIG. 1) and/or the operator device 150 (FIG. 1).

The example computing device 300 includes a variety of modules. For example, as illustrated, the example computing device 300 may include a processor 310, a memory 320, a communications module 330, and/or a storage module 340. As illustrated, the foregoing example modules of the example computing device 300 are in communication over a bus 350.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 300.

The communications module 330 allows the example computing device 300 to communicate with other computing devices and/or various communications networks. For example, the communications module 330 may allow the example computing device 300 to send or receive communications signals. Communications signals may be sent or received according to one or more protocols or according to one or more standards. For example, the communications module 330 may allow the example computing device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 330 may allow the example computing device 300 to communicate using near-field communication (NFC), via Wi-Fi™, using Bluetooth™ or via some combination of one or more networks or protocols. In some embodiments, all or a portion of the communications module 330 may be integrated into a component of the example computing device 300. For example, the communications module may be integrated into a communications chipset. In some embodiments, the communications module 330 may be omitted such as, for example, if sending and receiving communications is not required in a particular application.

The storage module 340 allows the example computing device 300 to store and retrieve data. In some embodiments, the storage module 340 may be formed as a part of the memory 320 and/or may be used to access all or a portion of the memory 320. Additionally or alternatively, the storage module 340 may be used to store and retrieve data from persisted storage other than the persisted storage (if any) accessible via the memory 320. In some embodiments, the storage module 340 may be used to store and retrieve data in a database. A database may be stored in persisted storage. Additionally or alternatively, the storage module 340 may access data stored remotely such as, for example, as may be accessed using a local area network (LAN), wide area network (WAN), personal area network (PAN), and/or a storage area network (SAN). In some embodiments, the storage module 340 may access data stored remotely using the communications module 330. In some embodiments, the storage module 340 may be omitted and its function may be performed by the memory 320 and/or by the processor 310 in concert with the communications module 330 such as, for example, if data is stored remotely. The storage module may also be referred to as a data store.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
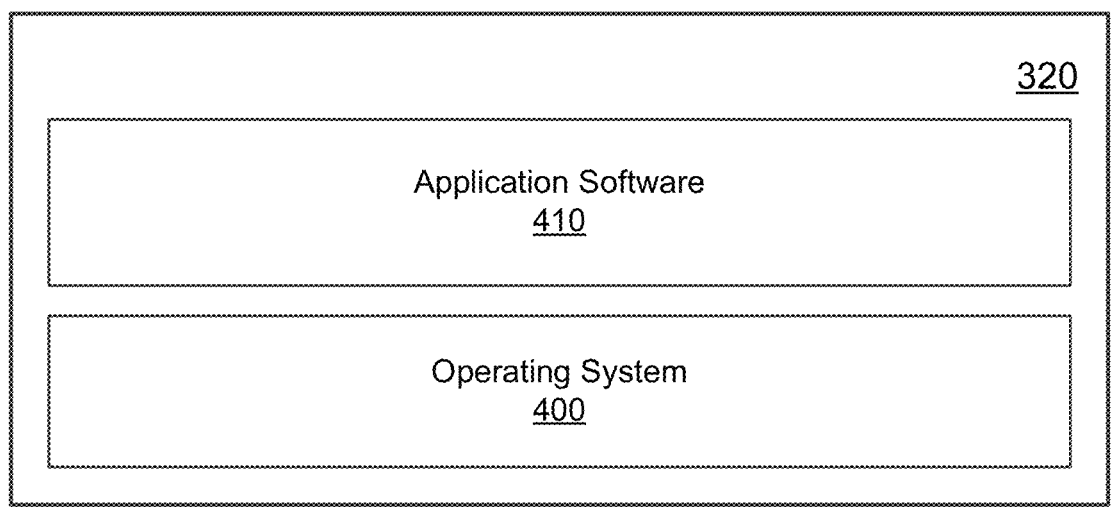
FIG. 4 shows a simplified organization of software components stored in a memory of the example computing device of FIG. 3.

FIG. 4 depicts a simplified organization of software components stored in the memory 320 of the example computing device 300 (FIG. 3). As illustrated, these software components include an operating system 400 and an application 410.

The operating system 400 is software. The operating system 400 allows the application 410 to access the processor 310 (FIG. 3), the memory 320, and the communications module 330 of the example computing device 300 (FIG. 3). The operating system 400 may be, for example, Google™ Android™, Apple™ iOS™, UNIX™, Linux™, Microsoft™ Windows™, Apple OSX™ or the like.

The application 410 adapts the example computing device 300, in combination with the operating system 400, to operate as a device performing a particular function. For example, the application 410 may cooperate with the operating system 400 to adapt a suitable embodiment of the example computing device 300 to operate as the computing device 250 (FIG. 2) of the remote computing device 100 (FIG. 1) or as the server 160 (FIG. 1) or as the operator device 150 (FIG. 1).

Where the application 410 is provided on the remote computing device 100, the application may be a submission application, which may also be referred to as a claim submission application. The application 410 may be a web-based or standalone application. The application 410 may be configured to engage in an authenticated session with the server 160. The authenticated session may occur, for example, after the remote computing device 100 has validly authenticated itself to the server 160 using, for example, one or more credentials. During the authenticated session, the remote computing device 100 may engage in encrypted communications with the server 160. For example, as will be described below, the remote computing device 100 may send image data to the server 160 and the server may use the image data to automatically process a claim (i.e., using photo-based estimation). The image data may be sent in an encrypted format. Conveniently, the encrypting of the image data may ensure that the server 160 only receives and processes images from authentic submission applications. Non-authentic submission applications cannot submit such image data since they are not able to encrypt the image data in a format that would be recognized or accepted by the server 160.

Where the application 410 is provided on the server 160, the application 410 may include a plurality of software modules associated with claim processing. For example, a fraud detection module may include computer-executable instructions for identifying possible fraudulent claims and/or images, a claim routing module may include computer-executable instructions for determining whether photo-based estimation is to be used or whether manual estimation is to be used, a photo-based estimation module may be used for processing a claim using photo-based estimation techniques, and/or a manual estimation module may be used for engaging an operator device 150 (FIG. 1) to process a claim manually. Other modules apart from those listed above may be included instead of or in addition to the modules identified and the functions described as being attributed to a specific module may instead be provided by another module. Further, one or more of the modules may not be included in the application 410 and/or may not be provided by the server 160 itself. For example, the server 160 may cooperate with other servers or computer systems which may provide some such functions.

Figure 5:
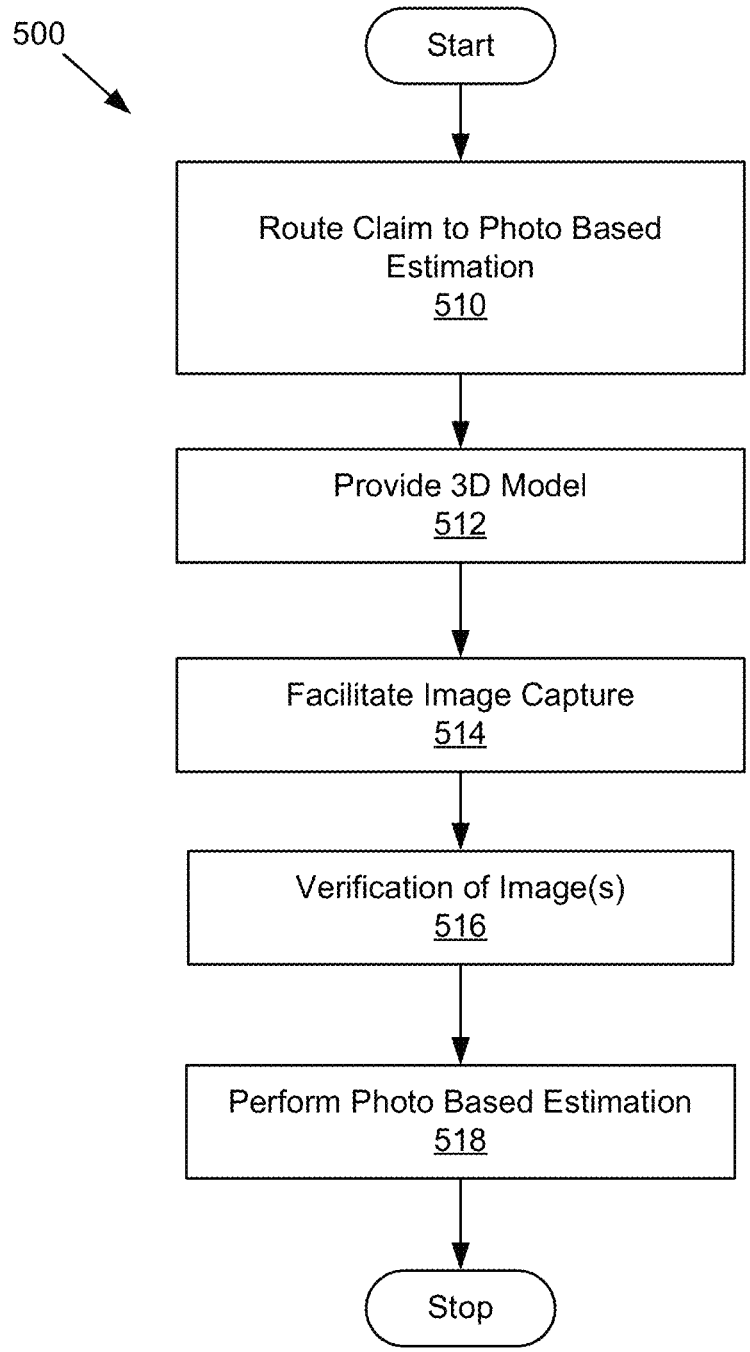
FIG. 5 is a flowchart showing operations performed by a server in performing photo-based estimation for a claim.

At least some components illustrated in FIG. 4 or FIG. 5 may take different forms depending on which of the computing devices they are provided on. For example, a server 160 may include or have access to a storage module 340 (which may also be referred to as a data store) which has stored there profiles for a plurality of parties, who may also be referred to as users or customers. The users may be insured persons, for example. The profiles may be or include policy data such as insurance policy data. The insurance policy data may specify information associated with an insurance policy which may, for example, be a vehicle insurance policy for an insured vehicle. The insurance policy data may, for example, include identification information or data for an insured person or an insured vehicle. By way of example, the insurance policy data for a given one of the profiles may specify vehicle identifying data for an insured vehicle. By way of example, the insurance policy data may specify a vehicle type of an insured vehicle. The vehicle type may be or include one or more of an indication of whether the vehicle is a car, an indication of whether the vehicle is a truck, an indication of whether the vehicle is a sports utility vehicle, an indication of whether the vehicle is a motorcycle, a make of the vehicle (e.g., a manufacturer name), a model of the vehicle (e.g., a model name), a year of the vehicle (e.g., a year or production or "model year" of the vehicle), a trim line indication for the vehicle (which may also be referred to as a grade of the vehicle or trim level), an indication of a paint colour, and/or an indication of an aftermarket modification (which may indicate whether any aftermarket modifications have been performed on the vehicle (e.g., lowering the car, adding a spoiler, etc.).

Alternatively or additionally, the insurance policy data may specify any one or more of: a vehicle identification number (VIN) for an insured vehicle, a policy identifier associated with a profile (e.g., an insurance policy number), one or more user identifiers (e.g., a name, address and/or contact information) and/or a location.

The profiles may also include other information or data about an insured vehicle. For example, a logo (such as a manufacturer logo), a vehicle body template, and/or a three-dimensional vehicle model may be included in one or more of the profiles. Some such data may be used, for example, to evaluate a claim. For example, a logo displayed in an image submitted to the server 160 by the remote computing device 100 may be used to determine whether the image is of an insured vehicle. For example, the logo may be compared with the logo in the profile.

It will be appreciated that at least some of the information described above as being provided in the profile may, instead, be stored elsewhere and may be retrieved based on data in an active profile. For example, the server 160 may determine that a user is associated with a particular one of the profiles and may retrieve a year, make and model of an insured vehicle from that profile. The server 160 may then use the year, make and/or model to determine further information about the vehicle, such as the logo, vehicle body template and/or three-dimensional vehicle model.

In some embodiments, the profiles may store an indication of whether a customer is eligible for photo-based estimation. The indication may, for example, be a flag. The flag may be considered by the server 160 when the server 160 determines whether a claim should be routed to photo-based estimation or whether the claim should be routed to manual estimation.

The storage module 340 may, in some embodiments, store a set of makes and models that are or are not eligible for photo-based estimation. For example, a whitelist and/or blacklist of vehicle types may be stored. The whitelist may indicate vehicle types that are eligible for photo-based estimation and the blacklist may indicate vehicle types that are not eligible for photo-based estimation. The server 160 may use the whitelist or blacklist in determining whether photo-based estimation should be used to automatically process a claim.

Each profile may be associated with one or more credential that may be stored therewith. The credential may be or include any one or more of: a token, a policy identifier, a user name, a personal identification number (PIN), biometric data, and/or a password. The credential may be used by the server 160 to authenticate the remote computing device 100. More specifically, the credential may be used to determine that the remote computing device 100 is being operated by au authorized user and to identify a profile that is to be used while interacting with that user via the remote computing device 100 (i.e., to identify an "active" profile).

The storage module 340 may store data representing preferred scenes for vehicles for a plurality of vehicle types. The preferred scenes may each be associated with a vehicle type and a damage location. For example, a given one of the preferred scenes may be associated with damage near a front left wheel for a particular make of vehicle. The data regarding the preferred scenes may, for example, reflect a base vehicle and the data regarding the preferred scenes may be used to aid a user in capturing an image of a vehicle that will be suitable for photo-based estimation.

Operations performed by the remote computing device 100 and the server 160 will be described below with reference to FIGS. 5-14.

The operation of the server 160, the remote computing device 100 and the operator device 160 in facilitating claim processing will now be described. Referring first to FIG. 5, a flowchart showing example operations in processing a claim is described FIG. 5 is a flowchart showing operations performed by a server in performing photo-based estimation for a claim. The operations may be included in a method 600 which may be performed by the server 160. For example, computer-executable instructions stored in memory of the server 160 may, when executed by a processor of the server 160, configure the server 160 to perform the method 500 or a portion thereof.

At operation 510, the server 160 routes a claim to photo-based estimation. For example, the server 160 may engage a photo-based estimation module upon determining that a claim is an appropriate claim for photo-based estimation.

In at least some embodiment, the server 160 is configured to support both photo-based estimation and manual estimation. During photo-based estimation, photographs of an insured vehicle are evaluated to quantify the amount of damage and to provide an estimate.

When a claim is routed to photo-based estimation, at operation 512, the server may provide a three-dimensional vehicle model to the remote computing device. The server 160 may provide the three-dimensional vehicle model during a chat session with the remote computing device 100. The three-dimensional vehicle model may, for example, be rotatable and activatable.

At operation 514, the server 160 may facilitate image capture. For example, the server 160 may use data representing a preferred scene to enable image capture only when image data associated with an image capture module sufficiently corresponds to the data representing the preferred scene. As will be described in greater detail below, in at least some embodiments, the server 160 may only enable image capture when the image data sufficiently corresponds to the data representing the preferred scene.

At operation 516, the server 160 may perform verification of captured image data. The verification may, for example, confirm that the image represents an insured vehicle, and/or may confirm that the image was not tampered with.

After verification, the server 160 may, at operation 518, perform photo-based estimation using the image. During photo-based estimation, the server 160 may review the image to determine a location of any damage represented in the image and may determine an estimate based on the location of the damage and the vehicle at issue (which may be determined from profile data). While not illustrated in FIG. 5, if verification fails, the server 160 may instead direct the claim to manual estimation; for example, engage the operator device 150 (FIG. 1).

Various operations of the method 500 of FIG. 5 may include a number of sub operations or methods and at least some of the operations will now be discussed in greater details.

Figure 6:
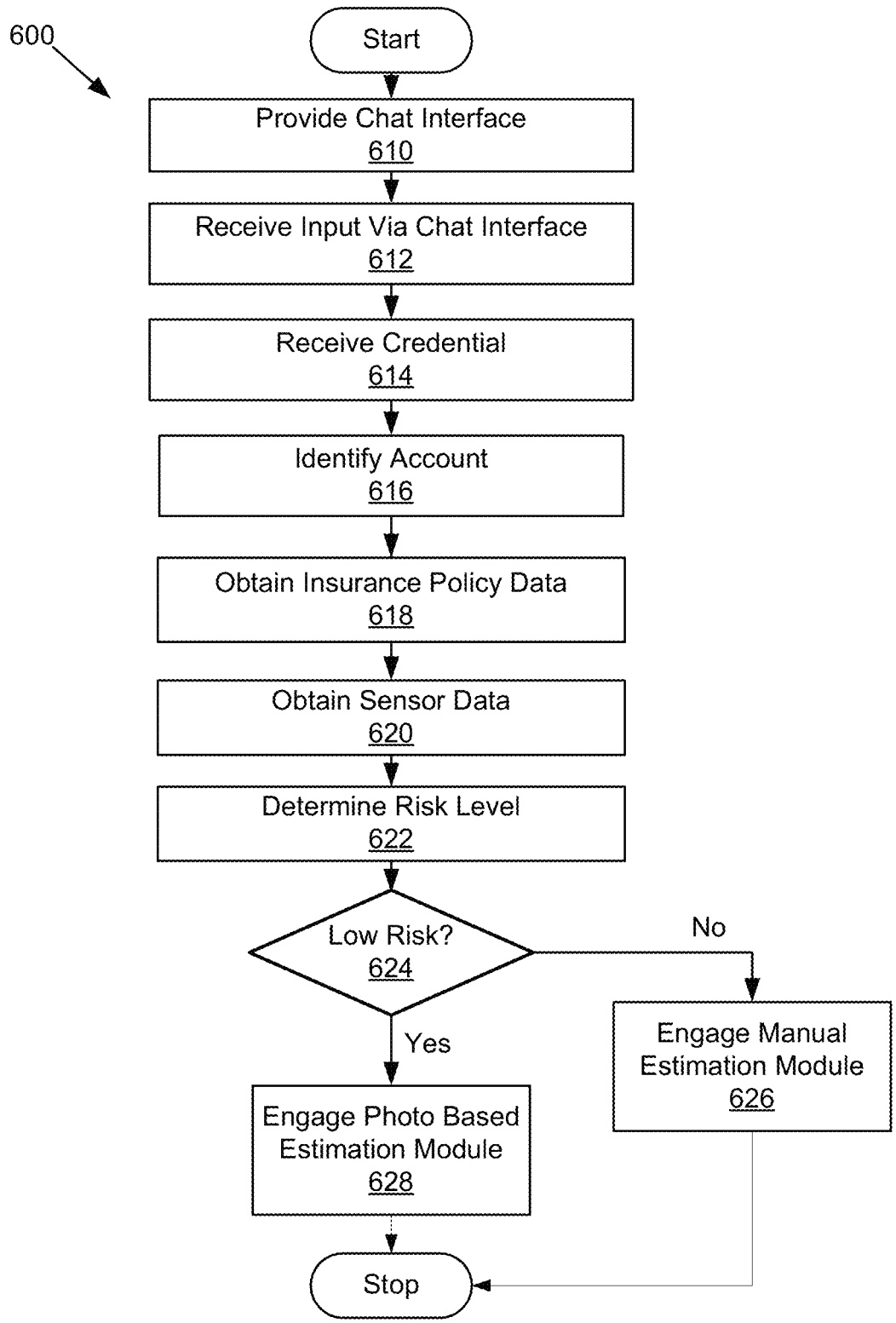
FIG. 6 is a flowchart showing operations performed by a server to route processing of a claim.

Referring now to FIG. 6, a method 600 of routing processing of a claim is illustrated. The method 600 may be performed by the server 160. For example, computer-executable instructions stored in memory of the server 160 may, when executed by a processor of the server 160, configure the server 160 to perform the method 600 or a portion thereof. The method 600 of routing or a portion thereof may be performed, for example, at operation 510 of the method 500 of FIG. 5. The method 600 of FIG. 6 may be referred to as a routing method or an automated triage method.

At operation 610, the server 160 may provide a chat interface to the remote computing device 100. That is, the server may send, via a communications module to a remote computing device, a first signal that comprises a chat interface.

Figure 11:
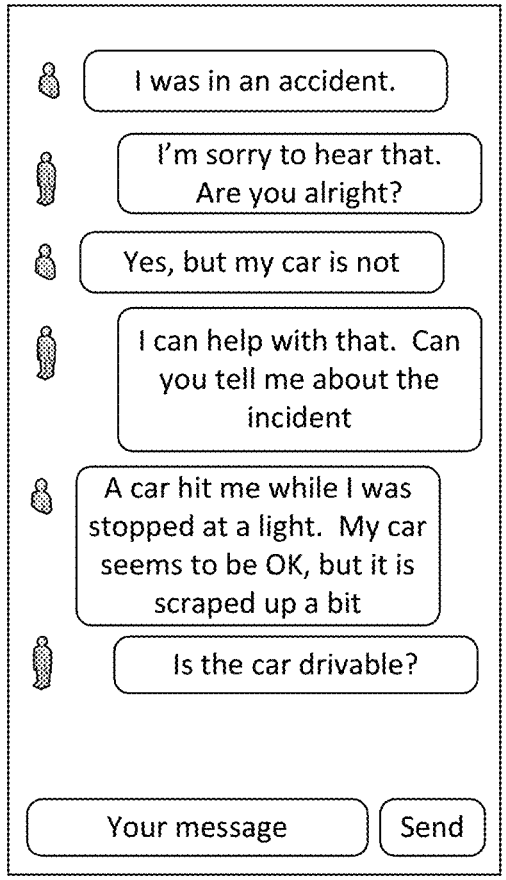
FIG. 11 is an example screen of a graphical user interface.

Referring briefly to FIG. 11, an example display screen 1100 that includes a chat interface is illustrated. The chat interface allows a user of the remote computing device 100 to send instant text messages to the server 160 and the server 160 receives such messages and uses a chat bot to respond to such messages. The chat bot analyzes the messages to extract data from such messages and/or to formulate and send a reply to such messages. The chat bot may, for example, automatically engage in a dialogue with the server 160 which attempts to obtain data regarding a claim. For example, the chat bot may attempt to obtain answers to one or more predetermined questions that may be used for claim routing purposes.

The server 160 may be equipped with a natural language processing engine which may be used to interpret messages received from the remote computing device 100. In the example of FIG. 11, the server 160 receives, from the remote computing device 100, a message indicating that a user of the remote computing device 100 was in an accident. In response, the server 160 analyzes the message and determines, from the message, that a user has a claim to submit (e.g., by determining that the user has been in an accident). The server 160 may then consult a predetermined question list to identify a question to send to the remote computing device 100. The identified question, in the example, is "are you alright". The server 160 may continue to receive answers to questions and may send replies, which may be additional questions, to the remote computing device 100.

The server 160 may, therefore, engage in a chat with the remote computing device 100 which may, in some example embodiments, appear to a user of the remote computing device to involve a human operator but which, in fact involves a chat bot. In other embodiments, the remote computing device 100 may be informed that it is engaging with a chat bot and may generate an output, such as a display, which informs a user of the chat-bot.

The chat-bot may, therefore, be configured to prompt a user of the remote computing device 100 to input one or more data points that may be used to automatically evaluate a claim. At operation 620, the server 160 may receive, via the communications module and from the remote computing device, a second signal representing input received at the remote computing device through the chat interface.

Accordingly, the chat interface may provide a free-form input interface which allows for the input of information via text or speech and the chat bot may perform natural language processing to identify relevant information.

The server 160 may also receive a credential for a user at operation 614. The credential may be one or more of: a token, a PIN, a policy identifier, a user name, biometric data, and/or a password. The credential may be received within the chat interface or outside of the chat interface. In an example in which the credential is received within the chat interface, the chat may prompt a user to provide identifying information such as a name, address, contact information or policy number. In an example in which the credential is received outside of the chat interface, a submission application on the remote computing device may provide a token to the server 160 or a password to the server.

The server 160 may, at operation 616, identify an account associated with the remote computing device. For example, the server may identify one of the profiles in a storage module based on the credential(s). Once the credential(s) are verified as corresponding to a profile, an authenticated session may be said to have begun.

While not specifically illustrated in FIG. 11, the server 160 may process received input to determine a reply to the received input and may send the reply to the remote computing device 100 via the communications module. The server 160 may then receive further input, which may be further processed.

Referring again to FIG. 6, at operation 618, the server 160 retrieves insurance policy data associated with the identified account/profile from the storage module (which may also be referred to as a data store). Example insurance policy data is described in greater detail above.

In at least some embodiments, the server 160 may also obtain sensor data from the remote computing device at operation 620. The sensor data may be data generated by a sensor module associated with the remote computing device 100. For example, the server 160 may receive a location from the remote computing device. The location may be obtained at the remote computing device from a location subsystem.

Next, at operations 622 and 624, the server 160 may automatically evaluate the input received at operation 612 and the policy data obtained at operation 618 against pre-determined criteria to determine whether a claim has a low risk level.

In evaluating the input and the policy data, the server may consider the potential claim scope (e.g., the potential liability to the insurer) and one or more indicators of possible fraud (such as a claims history), in order to determine, in real-time, whether photo-based evaluation is appropriate. The evaluation process may consider information stored at the server-side in order to make this evaluation (e.g., the make, model and/or year of the insured vehicle, a claim history, a residential location of the user, etc.) and/or may consider information received from the user about the severity of the accident (e.g., information about whether the vehicle is drivable, whether a police report was filed or emergency officials were involved, whether airbags were deployed, etc.).

By way of example, in evaluating the risk level, the server 160 may determine that a claim does not have a low risk level when a vehicle represented by a make or model specified in the identified profile is determined to be expensive to repair. This determination may be made by comparing a make or model specified in the obtained policy data to a predefined set of makes or models stored in a data store, such as the storage module. For example, where a make and model pair listed in an identified profile is included in a blacklist, then the server 160 may determine that a risk level is high. Alternatively, if the make and model pair is listed in a whitelist, then the server may determine that the risk level is low.

By way of further example, in evaluating the risk level, the server 160 may determine that the claim does not have a low risk level when the input indicates that an air bag has been deployed. By way of yet further example, the server 160 may determine that the claim does not have a low risk level when the input indicates that a vehicle is not drivable.

In at least some embodiments, the server 160 may also evaluate other information such as a location associated with a remote computing device being used by the insured party. For example, a location obtained at operation 620 may be compared with a residential location of the insured party to determine if the obtained location indicates that the user is too far from home (e.g., greater than a threshold distance, or outside of a home city, country, etc.) or if it is near an area (which may be determined from a blacklist) that is known to have a high incidence of fraud. If the obtained location is too far from a home location, the server 160 may determine that the risk for fraud is too high to proceed by way of photo-based estimation. Accordingly, in at least some embodiments, evaluating the risk level may include determining that a claim does not have a low risk level when a received location does not correspond to a location specified in the policy data.

In evaluating the risk level, the server may also consider a claims history (which may be stored in or associated with the identified account/profile). If the user has a recent claim, a claim having a value that exceeds a particular threshold, or an extensive claims history, then the server may determine (at operation 624) that the risk is high.

Note that, in determining whether the risk is too high, various factors or types of risk may be considered. For example, in some instances, the factors and/or risk may be related to fraudulent activity. That is, the server 160 may determine that the risk is too high if indicators suggest a high level of fraudulent activity. In some instances, the factors and/or risk may be related to the risk that a claim may be processed with an inaccurate estimate. Factors that may suggest an inaccurate estimate may, for example, include factors such as whether the vehicle is one that is known (i.e., is on a blacklist) as having characteristics that make it difficult to perform photo-based estimation. For example, certain vehicles may be known to have a paint or other feature that is known to make it difficult to obtain quality photographs and such vehicles may be considered high risk. By way of further example, in some instances, it may be known that an expensive part is located internally near a certain portion of a vehicle and damage that is indicated to be in the region of that part may be difficult to estimate since external examination will not accurately indicate whether the part needs replacement. In such an instance, the server 160 may determine that the risk is too high.

In at least some embodiments, if the server 160 determines (at operation 624), based on any of the above information, that the risk level is high, then the server 160 may prevent photo-based estimation from being engaged. Instead, the server may initiate a manual estimation procedure by engaging a manual estimation module at operation 626. The manual estimation module may then direct the claim to an operator device 150.

Accordingly, in some implementations, the manual estimation module may be engaged by routing a chat session to a computer terminal associated with a human operator, such as the operator device 150 of FIG. 1. The chat bot may hand the chat session over to the operator unbeknownst to the insured party (or it may hand the chat session to the operator in a transparent manner so that the nature of the interaction is known to the insured party). In other implementations, the manual estimation procedure may be engaged by displaying a message on the insured party's device instructing the insured party to contact a call center. For example, the manual estimation module may hand over an ongoing chat between the remote computing device and a chat bot provided on the server 160 to an operator device 150 to allow an operator to take over the chat. In other embodiments, the manual estimation module may cause the claim process to be directed to a voice-based system. For example, a telephone call may be automatically placed to connect the remote computing device 100 with the operator device 150.

In some implementations, machine learning may be used to train the server 160 to detect indicators of risk. For example, the server 160 may include an artificial intelligence risk detection component that may be trained using previous chat data from previous chat sessions and risk information that may be associated with such chat sessions.

Figure 14:
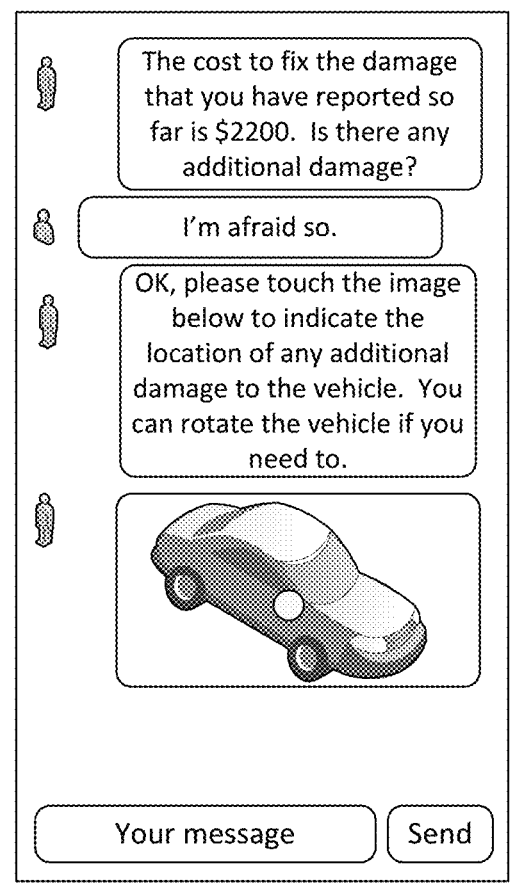
FIG. 14 is yet a further example screen of a graphical user interface.

If, based on the information available to the server 160, the claim is determined (at operation 624) to have a low risk, then the server 160 may (at operation 628) automatically engage a photo-based estimation module. As described above, the photo-based estimation module is configured to remotely receive an image at the remote computing device and provide a real-time estimate based on the received image. The real-time estimate may be delivered to the remote computing device 100 within the chat interface immediately after receipt of the image. An example display screen 1400 is illustrated in FIG. 14 which includes a real time estimate within a chat message sent from the server 160 to the remote computing device 100 and displayed on a display of the remote computing device.

The risk level may be continually assessed as the chat progresses and, if at any point the risk is determined to be too high, then the manual estimation module may be engaged. That is, operation 624 may be repeated as further input is received via the chat interface.

In engaging the photo-based estimation module, the server 160 may send, to the remote computing device 100 via the communications module, a user interface having a selectable option to send image data to the server. An example of one such user interface is illustrated as a display screen 1300 in FIG. 13. The display screen prompts a user to capture image data. The remote computing device 100 may then capture image data and may send a signal representing the image data to the server 160. The server 160 receives the image data and automatically analyzes the image data to obtain an indicator. The indicator numerically quantifies an amount of damage to the vehicle. The indicator may, for example, be an estimated replacement or repair cost. The server 160 sends, via the communications module to the remote computing device, a numerical value based on the indicator. For example, the server 160 may send the replacement or repair cost to the remote computing device 100 where it may be displayed.

In some embodiments, automatically analyzing the image data to obtain an indicator may include identifying a damaged component on the vehicle and performing a lookup of the indicator in the data store based on the identified damaged component. By way of example, the server 160 may determine that a bumper is damaged and requires replacement and may perform a lookup of the replacement cost of the bumper.

The identification of damage on the vehicle may be made by analyzing an image of the vehicle. For example, image processing techniques may compare the vehicle in the image to data representing a base vehicle (i.e., an undamaged vehicle). The data representing the base vehicle may, for example, including a mapping of parts. For example, the data representing the base vehicle may be an image of a vehicle which includes markers or identifiers indicating a part associated with various portions of the image. Upon identifying location(s) of the received image that do not sufficiently correspond to similar locations of the base vehicle image, the server 160 may determine that such locations represent damaged components and may then identify the damaged components from the mapping of parts.

As illustrated in the display screen 1400 of FIG. 14, after the server 160 has received an image of a vehicle and sent the remote computing device 100 a numerical value, such as an estimate of a repair or replacement or claim cost, the server 160 may display a prompt at the remote computing device 100 to request additional images. The server may then receive a further signal representing further image data, may automatically analyze the further image data to update the indicator and may send, via the communications module and to the remote computing device, a further numerical value based on the updated indicator. That is, as additional damage is reported, the estimate may be automatically updated. Conveniently, the update may be performed in real-time.

The method 600 of FIG. 6 automatically routes claims by automatically performing triaging. It may be noted that routing claims prior to engaging photo-based estimation may allow for storage savings and bandwidth savings since images are not sent if they are not needed. That is, the method 600 may offer bandwidth or storage savings as compared with solutions which do not pre-screen before engaging photo-based estimation since such systems may unnecessarily consume resources associated with the transfer and storage of image files that are ultimately not used when it is later determined that photo-based estimation is inappropriate.

Figure 7:
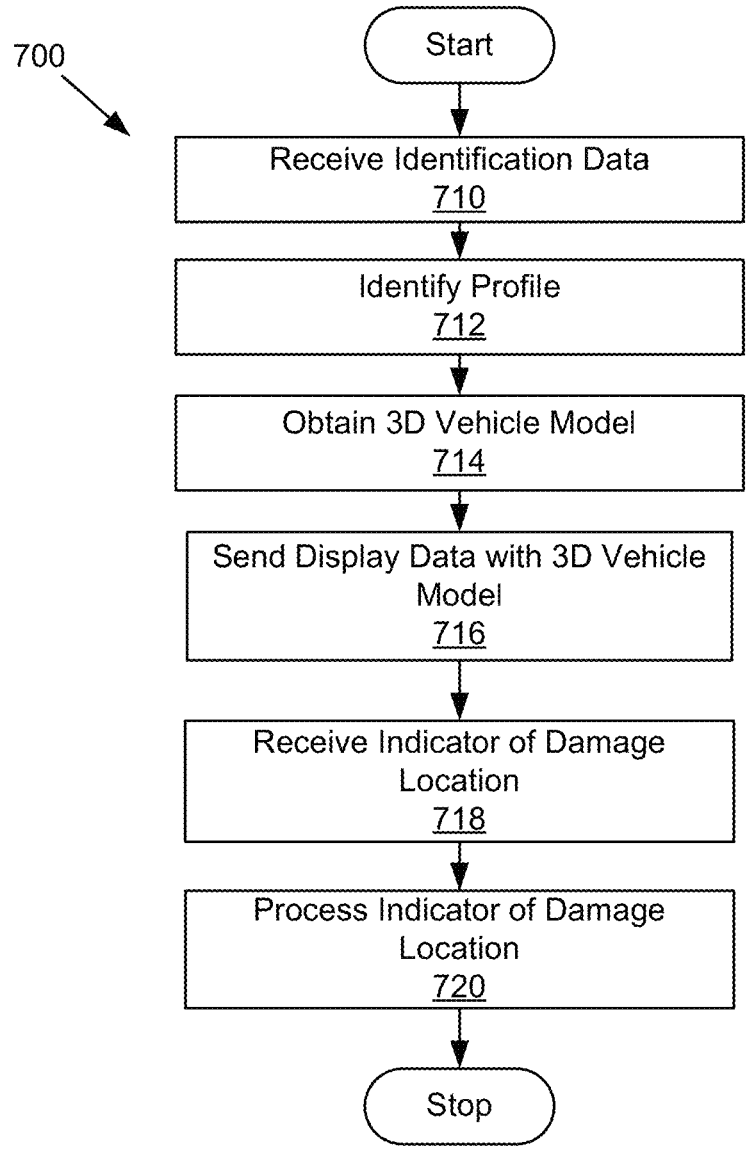
FIG. 7 is a flowchart showing operations performed by a server to remotely determine a location of damage to a vehicle.

Referring now to FIG. 7, a method 700 of remotely identifying a location of damage is illustrated. The method 700 may be performed by the server 160. For example, computer-executable instructions stored in memory of the server 160 may, when executed by a processor of the server 160 configure the server 160 to perform the method 700 or a portion thereof. The method 700 of FIG. 7 or a portion thereof may be performed, for example, at operation 512 of the method 500 of FIG. 5.

At operation 710, the server 160 receives, via the communications module and from a remote computing device, a signal representing identification data. The identification data may, for example, be a credential. The credential may be one or more of: a token, a PIN, a policy identifier (such as a policy number), a user name, biometric data and/or a password. The credential may be received within the chat interface or outside of the chat interface. In an example in which the credential is received within the chat interface, the chat may prompt a user to provide identifying information such as a name, address, contact information or policy number. In an example in which the credential is received outside of the chat interface, a submission application on the remote computing device may provide a token to the server 160 or a password to the server.

Where the method 700 is performed in conjunction with the method 600 of FIG. 6, operation 710 of the method 700 and operation 614 of the method 600 may be a common operation. Features that are described above with respect to operation 614 may be performed or provided at operation 710.

Next, at operation 712, the server 160 identifies, based on the identification data, one or more of the profiles stored in the data store. That is, the server identifies the profile that is associated with the received identification data. Where the method 700 is performed in conjunction with the method 600 of FIG. 6, operation 712 of the method 700 and operation 616 of the method 600 may be a common operation. Features that are described above as being performed or provided at operation 616 may be provided at operation 712.

Next, at operation 714, the server 160 obtains a three-dimensional (3D) vehicle model based on the identified profile. The 3D vehicle model may be obtained from a data store that stores a plurality of 3D vehicle models. Each 3D vehicle model may be associated with a particular type of vehicle and, in identifying the 3D vehicle model, the server 160 may first identify a vehicle type of an insured vehicle, based on the identified profile. For example, the server may obtain, from the profile, insured vehicle identifying data. The insured vehicle identifying data may identify a vehicle type. The vehicle type may be one or more of: an indication of whether the vehicle is a car; an indication of whether the vehicle is a truck; an indication of whether the vehicle is a sports utility vehicle; an indication of whether the vehicle is a motorcycle; a make of the vehicle; a model of the vehicle; a year of the vehicle; a trim line indication for the vehicle; or an indication of an aftermarket modification. After identifying the vehicle type of the insured vehicle from the identified profile, the server 160 may then retrieve the three-dimensional vehicle model from a vehicle model database based on the vehicle type.

In some instances, the retrieved three-dimensional vehicle model may represent the same vehicle as the insured vehicle (i.e., the same year, make and model). In other embodiments, the retrieved model may be of a similar (but not the same) vehicle to the insured vehicle. For example, the vehicle may be of a common type (e.g., an SUV where the insured vehicle is an SUV).

In some instances, the server 160 may have access to redesign timeline data. The redesign timeline data may, for example, indicate years when a vehicle underwent a redesign (as opposed to a minor refresh which occurs in most model years). That is, the redesign timeline data may define vehicle generations. A vehicle generation is represented by date ranges which indicate the times when the vehicle had a generally common design. When a redesign occurs, a new vehicle generation begins.

The redesign timeline data may be used by the server 160 when selecting an appropriate 3D vehicle model. For example, when selecting an appropriate 3D model to use for a given insured vehicle, the server 160 may prefer to select a 3D vehicle model that is within a same vehicle generation as the insured vehicle. The server 160 may be configured to, for example, select a 3D vehicle model of a vehicle that is of the same vehicle generation as an insured vehicle, even if there is another 3D vehicle model of a vehicle that has a closer model year but that is of a different vehicle generation. For example, if 3D vehicle models are available for a particular vehicle in 2012 and 2018 and an insured vehicle is a 2017 vehicle, and if the redesign timeline data indicates that a redesign occurred in 2018, the server 160 may select the 2012 version of the 3D vehicle model.

Next, at operation 716, the server 160 sends, via the communications module to the remote computing device, a signal representing display data. The display data includes the three-dimensional vehicle model and a damage location indicator overlaid on the three-dimensional vehicle model. The damage location indicator is selectable to input an indication of a damage location. The display data may include a graphical user interface that allows for interaction with the 3D vehicle model. An example of one such graphical user interface is illustrated in display screens 1200, 1300, 1400 of FIGS. 12 to 14 respectively. The graphical user interface may allow for rotation of the 3D vehicle model. For example, the vehicle may be rotated on the display by selecting an area associated with the vehicle and moving a pointing device (such as a finger) in a direction of rotation after such selection. Touch gestures may, for example, be used to control an angle of rotation associated with the 3D vehicle model.

Figure 12:
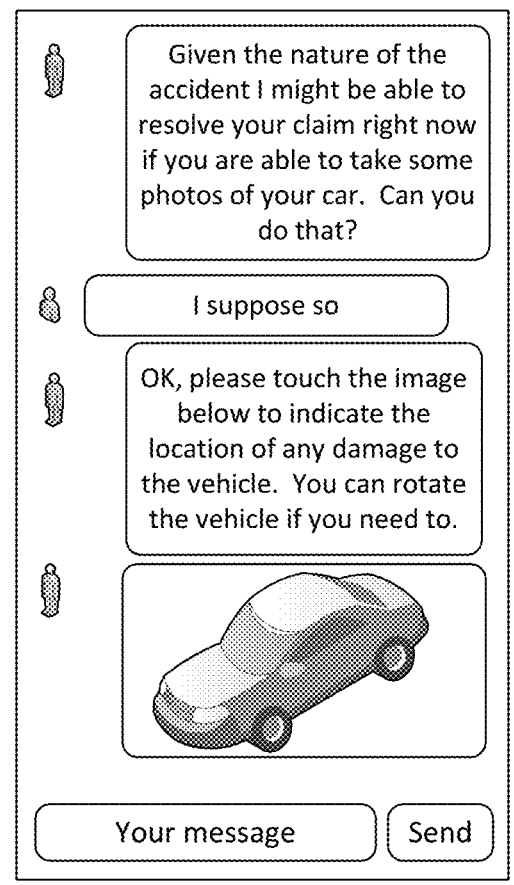
FIG. 12 is a further example screen of a graphical user interface.
Figure 13:
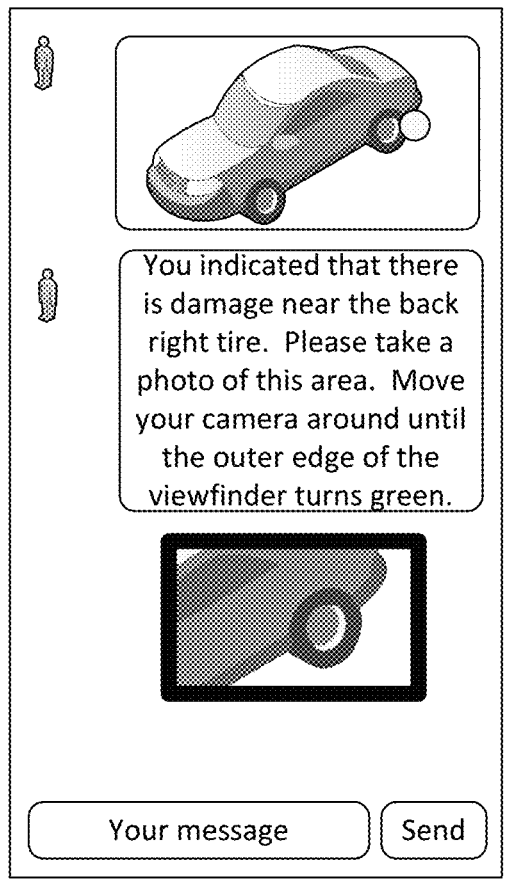
FIG. 13 is yet a further example screen of a graphical user interface.

As illustrated in FIGS. 12 to 14, the display data sent to the remote computing device 100 may cause the remote computing device 100 to display the 3D vehicle model in a chat interface. For example, the 3D vehicle model may be displayed as a message below a last message displayed in the chat interface. The three-dimensional model may be rendered using OpenGL ES, for example.

The display data sent to the remote computing device 100 includes both a 3D vehicle model and a damage location indicator overlaid on the 3D vehicle model. The damage location indicator is selectable by a user via an input interface (such as a touchscreen associated with the remote computing device 100). The damage location indicator may include a plurality of selectable locations. Each selectable location may be associated with location information defining a location. For example, the plurality of selectable locations may be or include a grid.

In some instances, the display data may include a selectable option to toggle between 2D and 3D viewing. In some embodiments, the display data may allow a user may be to indicate a location in 2D by selecting for example, three planes and adjusting accordingly. In such instances there may be a selectable feature or gesture which allows the user to toggle between the 2D and 3D views. In some instances, the views may be displayed in planes perpendicular to the plane being set. In some instances, the plane being set may be highlighted on the visual interface in the chat session for the user to interact with.

The remote computing device 100 receives the display data and displays the 3D vehicle model and the damage location indicator overlaid thereon. An input may then be received at the remote computing device via an input interface. The input may be a selection of the damage location indicator. The selection may be made, for example, using force touch (iOS) or double tap (Android) or using other gestures. After receiving the input, the remote computing device 100 may send a signal comprising an indicator of the location of damage to the server 160, where the indicator of the location of damage is received at operation 718. The indicator of the location of damage may be based on location information of a selected on of a plurality of locations specified in the damage location indicator. The indicator of the location of damage may indicate, to the server, a location where a vehicle has sustained damage. In one example, the indicator of the location of damage may indicate a side (e.g., left, right, front, back) associated with the damage. In some embodiments, the indicator of the location of damage may include an image that was obtained at the remote computing device. For example, as illustrated in FIG. 13, after input is received selecting a location on the 3D vehicle model, the remote computing device 100 may initiate image capture and an image may be captured and sent to the server 160.

The server 160 may use the indicator of the location of damage in automatically evaluating the claim (at operation 720). For example, the server 160 may analyze the indicator of the location of damage to obtain a damage quantum indicator. The damage quantum indicator may numerically quantify an amount of damage to the insured vehicle. For example, the damage quantum indicator may be an estimate of the value of a repair, replacement or claim. The server may send, via the communications module and to the remote computing device, a numerical value based on the damage quantum indicator. The numerical value may, for example, be the estimate.

It may be noted that vehicle types can vary considerably and it may be confusing to a user when a model is displayed that does not accurately represent the type of vehicle for which a user is attempting to submit a claim. For example, if a party has insured a motorcycle but a car is displayed as the 3D vehicle model, the user may have difficulty interacting with the 3D model. Conveniently, the techniques described above may allow for display of a customized 3D vehicle model for the user. The customization may be performed based on data associated with the insurance policy. For example, the insurance policy may store information about the make, model, year, trim line, etc. associated with the vehicle. As noted above, the server may identify the insured party based on identifying information (such as a name, address, policy number, password, token, plate number, etc.) received at the user's electronic device and submitted to the server. The server may then use this information to obtain the appropriate 3D vehicle model. For example, a database may be populated with 3D vehicle models of various vehicles and the server may use the model that most closely represents the insured vehicle, thus allowing for ease of interaction with the 3D vehicle models. In some embodiments, a user may augment their vehicle and, in such situations, the 3D vehicle model may be selected based on the modification or may be augmented based on the modification. The modification may be identified by the server based on an indication of an aftermarket modification stored in the identified profile.

While not illustrated in FIG. 7, the server 160 may continue to evaluate whether photo-based estimation is appropriate during the method 700 of FIG. 7. For example, as images are received and a damage quantum indicator determined, the server 160 may compare the damage quantum indicator to a threshold and, if the damage quantum indicator exceeds the threshold, it may end photo-based estimation and engage the manual estimation module.

Figure 8:
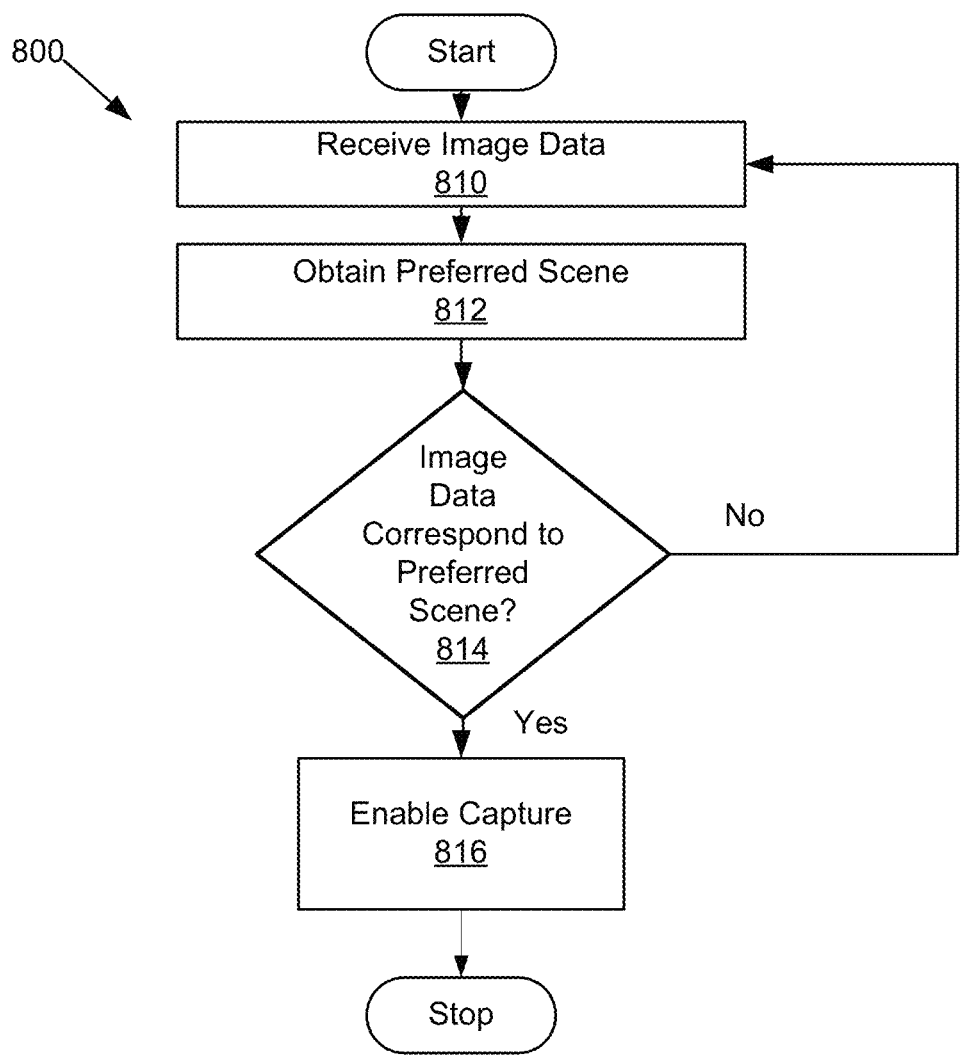
FIG. 8 is a flowchart showing operations performed by a remote computing device to enable capture of an image.

Referring now to FIG. 8, a method 800 of enabling image capture is illustrated. The method 800 may be performed by the remote computing device 100 in conjunction with the server 160. For example, computer-executable instructions stored in memory of the remote computing device 100 may, when executed by a processor of the remote computing device 100, configure the remote computing device 100 to perform the method 800 or a portion thereof. The method 800 of FIG. 8 or a portion thereof may be performed, for example, at operation 514 of the method 500 of FIG. 5.

At operation 810, the remote computing device 100 receives, from a camera associated with the remote computing device, a signal comprising image data. The image data represents at least a portion of a vehicle.

Next, at operation 812, the remote computing device 100 retrieves data representing a preferred scene of the vehicle. Retrieving data representing the preferred scene of the vehicle may include obtaining the preferred scene of the vehicle based on a policy associated with the vehicle. In some embodiments, the data representing the preferred scene of the vehicle is retrieved from the server 160. For example, the remote computing device may send, via the communications module to the claim-processing server, a signal representing a credential associated with a policy. The credential may be one or more of: a token, a policy identifier, a user name, and/or a password. As described above with reference to operations 712 and 616, the server 160 may use the credential to identify a profile, account and/or policy. For example, the server may be a claim-processing server and may be configured to use the credential to identify a type of an insured vehicle and to send the preferred scene of the vehicle based on the type of the insured vehicle.

The server 160 may then retrieve the data regarding the preferred scene of the vehicle and send the data regarding the preferred scene of the vehicle to the remote computing device 100 where it is received at operation 812.

The data representing the preferred scene of the vehicle may be data representing a base vehicle that is of a same type as the vehicle represented in the image data. In other embodiments, the data representing the preferred scene of the vehicle may be data representing a generic vehicle that is not of the same type as the vehicle represented by the image data. In at least some embodiments, the method 800 of FIG. 8 may be performed after the server 160 has received an indication of a location of damage using the techniques described above with reference to FIG. 7. In at least some such embodiments, the preferred scene of the vehicle may be based on the location of damage. For example, as illustrated in FIG. 13, a rear left tire could be selected to indicate that the rear left tire is damages and so the server 160 may obtain a preferred scene of the vehicle which represents the rear left tire.

In at least some embodiments, the data representing the preferred scene of the vehicle may define boundaries for images that are to be captured.

At operation 814, the remote computing device may determine, based on the image data and based on the data representing the preferred scene of the vehicle, whether the received image data corresponds to the preferred scene of the vehicle. When the received image data corresponds to the preferred scene of the vehicle, the remote computing device may enable capture of the image data at operation 816.

In some embodiments, to facilitate image capture, the remote computing device may display an image representing a desired capture area together with a viewfinder representing the image data received from the camera. For example, the desired capture area may be displayed on a common page as the viewfinder to allow a user to attempt to use the desired capture area as a model when framing a photo. In some embodiments, the image representing the desired capture area may be overlaid on the viewfinder. The overlay may facilitate image capture by allowing the user to attempt to make live camera data align with the desired capture area. In the overlay, the desired capture area may be displayed as a semi-transparent overlay so as not to block the live camera data.

In enabling image capture, the remote computing device may enable a camera shutter button to allow the camera shutter button to be selected to trigger image capture. That is, until the remote computing device determines that the image data corresponds to the preferred scene (at operation 814), the camera shutter button may be disabled and, in response to this determination, the camera shutter button may be enabled.

In some embodiments, in enabling image capture, the remote computing device may automatically adjust camera settings. For example, the remote computing device may automatically zoom an image and/or may automatically focus.

In other embodiments, enabling capture of the image data at operation 816 may include updating the graphical user interface to indicate that image capture is available. For example, when the image data corresponds to the preferred scene, the GUI may be updated. By way of example, the display screen 1300 of FIG. 13 includes a "go green" function whereby a frame around the viewfinder is updated to turn green when the image data corresponds to the preferred scene.

In other embodiments, enabling capture of the image data at operation 816 may include automatically capturing an image. That is, the remote computing device 100 may, upon determining that the image data corresponds to the preferred scene, automatically capture the image.

When the image does not correspond to a preferred scene, the remote computing device 100 may continue to receive image data and evaluate such image data until the image data is found to correspond to the preferred scene.

After an image has been captured, the remote computing device 100 may send, via the communications module, a signal representing the captured image data to a processing server configured to analyze the captured image data to assess vehicular damage. That is, the image may be used for photo-based estimation as described herein.

Figure 9:
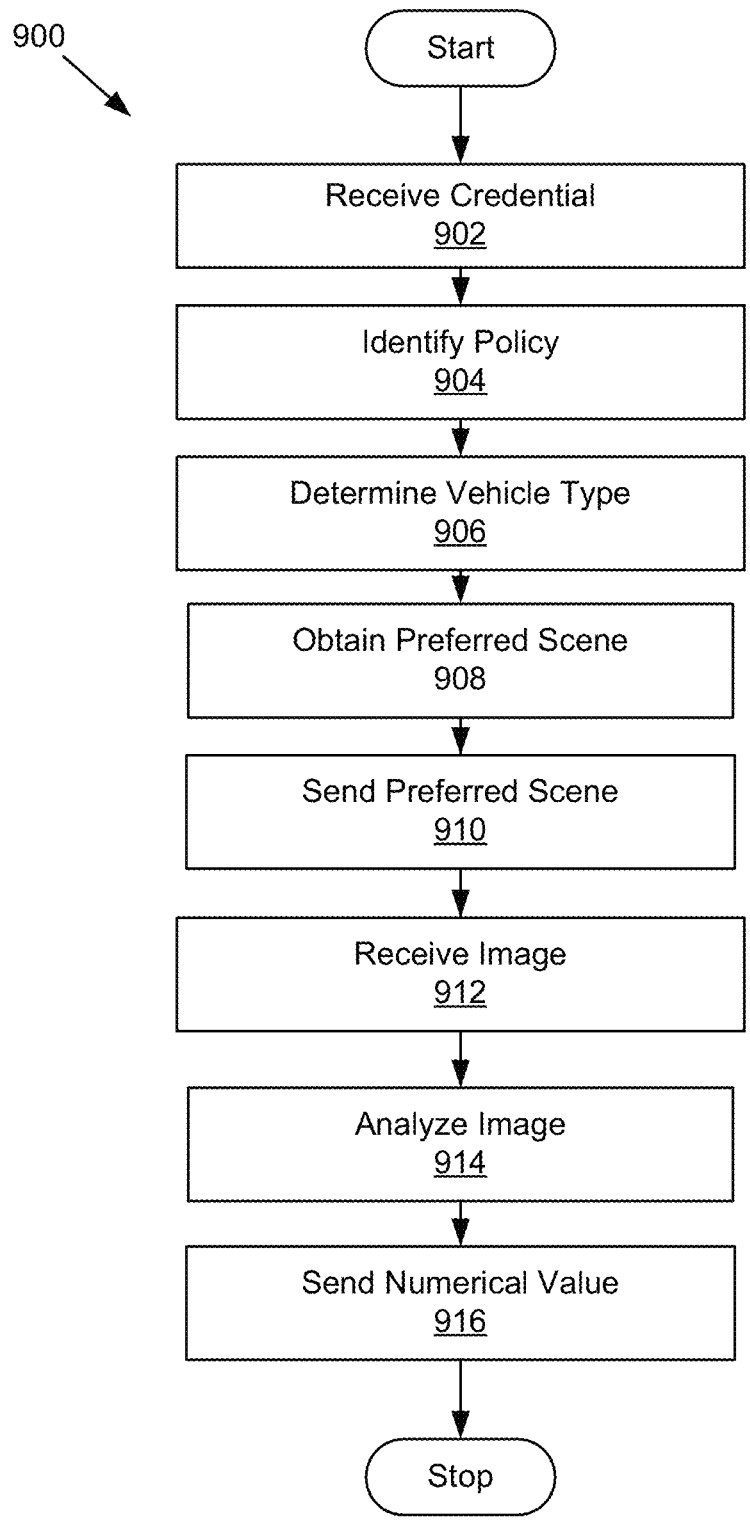
FIG. 9 is a flowchart showing operations performed by a server in providing photo-based estimation.

Referring now to FIG. 9, a method 900 of providing photo-based estimation is illustrated. The method 900 may be performed by the server 160. For example, computer-executable instructions stored in memory of the server 160 may, when executed by a processor of the server 160 configure the server 160 to perform the method 900 or a portion thereof. The method 900 of FIG. 9 or a portion thereof may be performed, for example, at operation 518 of the method 500 of FIG. 5. The method 900 may be performed in conjunction with the method 800 of FIG. 8.

At operation 902, the server 160 receives, via the communications module from a remote computing device, a signal representing a credential. The credential may be of the type described above and may be received as described above with reference to operation 614 of FIG. 6 or operation 710 of FIG. 7. Where the method 900 is performed in conjunction with the method of FIG. 6, the operations 902 and 614 may be common operations and where the method 900 is performed in conjunction with the method 700 of FIG. 7, the operations 902, 710 may be common operations. Features or functions described as being performed at operation 614 and/or 710 may be performed or provided at operation 902.

Next, at operation 904, the server 160 identifies, based on the credential, one of the policies stored in a data store. Operation 904 may be performed in the manner described above with reference to the operations 616, 712 of FIGS. 6 and 7 and may be performed together with such operations when these methods are performed in conjunction with one another. Features or functions described as being performed at operation 616 and/or 712 may be performed or provided at operation 904.

Next, at operation 906, the server 160 determines, based on the identified one of the policies, a vehicle type of an insured vehicle. Then, at operation 908, the server 160 obtains, from the data store and based on the vehicle type, data representing a preferred scene of a vehicle. Then, at operation 910, the server sends, via the communications module and to the remote computing device, the data representing the preferred scene of the vehicle and, at operation 912, receives, from the remote computing device, a signal comprising image data representing at least a portion of the insured vehicle. As described above with reference to FIG. 8, the data representing the preferred scene of the vehicle may be used by the remote computing device 100 to enable image capture so that the received image is one that is known to correspond to the preferred scene of the vehicle. Then, at operation 914, the server 160 may analyze the image data to obtain an indicator. The indicator may numerically quantify an amount of damage to the insured vehicle. For example, the server 160 may analyze the image data to obtain a damage quantum indicator. The damage quantum indicator may numerically quantify an amount of damage to the insured vehicle. For example, the damage quantum indicator may be an estimate of the value of a repair, replacement or claim.

In determining the indicator, image processing techniques may compare the vehicle in the image to data representing a base vehicle (i.e., an undamaged vehicle). The data representing the base vehicle may, for example, including a mapping of parts. For example, the data representing the base vehicle may be an image of a vehicle which includes markers or identifiers indicating a part associated with various portions of the image. Upon identifying location(s) of the received image that do not sufficiently correspond to similar locations of the base vehicle image, the server 160 may determine that such locations represent damaged components and may then identify the damaged components from the mapping of parts. A lookup may then be performed in a database to determine a value associated with the damaged components.

The server 160 may then send (at operation 916), via the communications module and to the remote computing device, a numerical value based on the indicator. For example, the server may send, via the communications module and to the remote computing device, a numerical value based on the damage quantum indicator. The numerical value may, for example, be an estimate.

Conveniently, by controlling the scene of an image, the server 160 can expect received images to have desired properties. This may, for example, simplify the analysis performed by the server 160 on the images. Thus, by controlling image quality and consistency, the photo-based estimation may be provided more efficiently and/or accurately.

Figure 10:
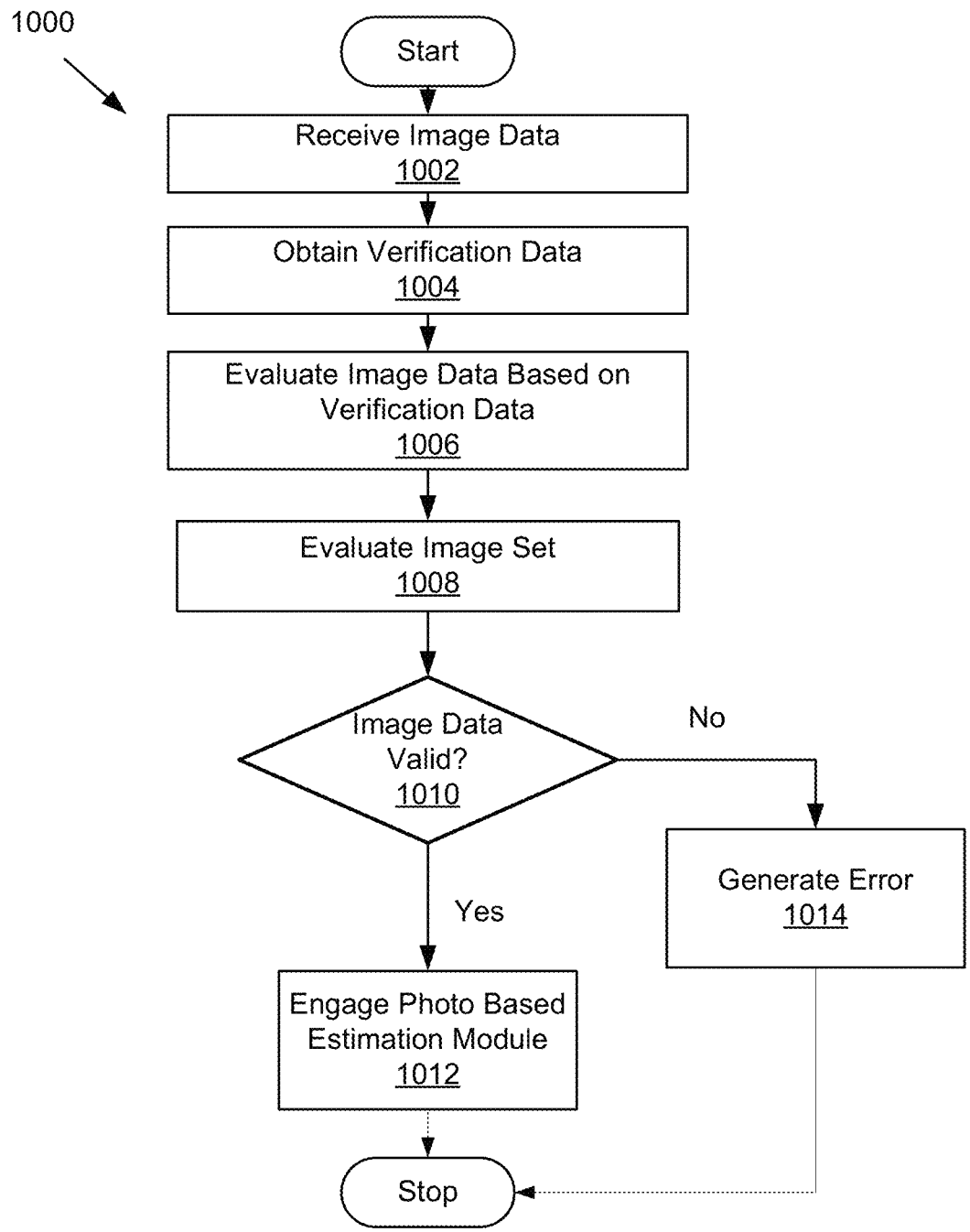
FIG. 10 is a flowchart showing operations performed by a server in evaluating image data.

Referring now to FIG. 10, a method 1000 of evaluating image data is illustrated. Image data may be evaluated to ensure its authenticity. For example, when photo-based estimation is used to automatically evaluate a claim, there is a risk that images may be tampered with or that non-authentic photos may be used. For example, photographic fraud could involve an altered photograph (e.g., a photo altered using photo-editing software, such as Photoshop™), a recycled photograph (e.g., a photo that has been used for a past claim), a photograph of a vehicle that is not the insured vehicle, a photograph that was taken a long time ago (e.g., before the alleged accident), etc.

The method 1000 of FIG. 10 may be used to screen images for at least some conditions prior to engaging the photo-based estimation module. The method 1000 may be performed by the server 160. For example, computer-executable instructions stored in memory of the server 160 may, when executed by a processor of the server 160, configure the server 160 to perform the method 1000 or a portion thereof. The method 1000 of FIG. 10 or a portion thereof may be performed, for example, at operation 516 of the method 500 of FIG. 5.

At operation 1002, the server 160 receives, via the communications module from a remote computing device, a signal comprising image data obtained by the remote computing device through activation of a submission application. The image data includes an image that may, for example, be the image that is received at operation 912 of the method 900 of FIG. 9 and the operations 1002 and 912 may be common operations. The image data may comprises an image of at least a portion of a vehicle associated with a claim.

Next, at operation 1004, the server 160 obtains verification data. The verification data includes at least one of policy data obtained from at least one of the stored profiles or sensor data received from the remote computing device. The verification data is data that is to be used to verify the authenticity of the received image. At operation 1006, the server 160 evaluates the image data based on the verification data to determine whether the image data is valid.

At operation 1004, the server 160 may identify the at least one of the stored profiles. The server 160 may identify the stored profile that is associated with the remote computing device 100 and/or a user of the remote computing device 100. For example, during operation 1004, the server 160 may receive, via the communications module and from a remote computing device, a signal representing identification data. The identification data may, for example, be a credential. The credential may be one or more of: a token, a PIN, a policy identifier (such as a policy number), a user name, and/or a password. The credential may be received within a chat interface or outside of the chat interface. In an example in which the credential is received within the chat interface, the chat may prompt a user to provide identifying information such as a name, address, contact information or policy number. In an example in which the credential is received outside of the chat interface, a submission application on the remote computing device may provide a token to the server 160 or a password to the server. Where the method 1000 is performed in conjunction with one or more of the methods described above, the receipt of the identification data may be performed during one of the similar operations (e.g., 710, 614, 902) of those methods. Features or functions described as being performed at operation 614, 710 and/or 902 may be performed or provided at operation 1004.

At operation 1004, the server 160 also identifies, based on the identification data, one or more of the profiles stored in the data store. That is, the server 160 identifies the profile that is associated with the received identification data. Where the method 1000 is performed in conjunction with one or more of the methods described above, the identification of a profile may be performed during one of the similar operations (e.g., 712, 616, 904) of those methods. Once the profile is identified, data associated with that profile may be used for evaluation purposes (at operation 1006). That is, the server 160 may evaluate the image data based on the verification data to determine whether the image data is valid. Features or functions described as being performed at operation 616, 712 and/or 904 may be performed or provided at operation 1004.

Examples of verification data and techniques for evaluating such data will now be discussed.

The image data that is received at operation 1002 may include an image of at least a portion of a vehicle and evaluating the image data based on the verification data may include determining, based on the at least one of the profiles (e.g., the identified profile), whether the vehicle in the image corresponds to an insured vehicle. If the vehicle represented in the image does not correspond to the insured vehicle in the profile, then this evaluation criteria may be said to have failed. If the vehicle represented in the image corresponds to the insured vehicle in the profile, then this evaluation criteria may be said to be satisfied.

Various techniques may be employed in order to determine whether the vehicle in the image corresponds to the insured vehicle. For example, in an embodiment, the remote computing device 100 may prompt a user to capture an image of a vehicle identification number (VIN). The server 160 may evaluate such an image by performing optical character recognition on the image to identify text in the image and then comparing the text in the image to a VIN in at least one of the profiles (i.e., in the identified profile). If the purported VIN in the image matches the VIN in the profile, then this evaluation criteria may be said to be satisfied, whereas if there is not a match then the evaluation criteria may be said to be failed.

By way of further example, the server 160 may determine whether the vehicle in the image corresponds to the insured vehicle by identifying one or both of a make or model of the vehicle in the image and comparing one or both of the identified make or model of the vehicle to a make or model in the at least one of the profiles (i.e., in the identified profile). The make or model may be identified in the image using various techniques. For example, identifying one or both of a make or model of the vehicle in the image may include any one or a combination of: identifying a logo in the image and comparing the logo to a logo associated with the make or model in the at least one of the profiles; identifying text in the image and comparing the text to the make or model in the at least one of the profiles; and performing an image-based analysis to determine whether a vehicle body of the vehicle in the image corresponds to a vehicle body template for the make or model in the at least one of the profiles.

When the make or model (as the case may be) in the image match the make or model in the profile, then this evaluation criteria may be said to be satisfied whereas if they do not match this evaluation criteria may be said to have failed.

By way of further example, the server 160 may determine whether the vehicle in the image corresponds to that in the profile based on a paint color. For example, the server 160 may identify a portion of the image that represents a body of the vehicle. Boundary identification techniques and/or template-based techniques may be used to identify the body of the vehicle, for example. The server 160 may determine a paint colour of the vehicle from the identified portion in the image. That is, once the body of the vehicle is identified, then a paint colour associated with the body of the vehicle may be determined. Then, the server 160 may determine whether the paint color of the vehicle corresponds to a paint color specified in the at least one of the profiles (i.e., the identified profile). When the paint colours match, this evaluation criteria may be said to be satisfied whereas when they do not this evaluation criteria may be said to have failed.

Evaluation of an image by the server 160 may be performed based on verification data that is sensor data. Where the verification data includes sensor data, the sensor data may be data generated by a sensor module based on a sensed condition associated with the remote computing device 100. For example, the sensor data may be associated with a location subsystem on the remote computing device 100 and may be a location obtained from the location subsystem. The submission application on the remote computing device 100 which cooperates with the server 160 may be configured to send the location to the server 160 and it may be received at the server at operation 1004. The location that is sent by the remote computing device 100 may be a location indicated by the location subsystem at the time of image capture on the remote computing device 100. While operation 1004 is indicated in FIG. 10 after operation 1002, in some embodiments, the order may be reversed and the location may be sent by the remote computing device immediately after image capture while the image itself might be sent sometime later.

The image represented by the image data may include metadata and the metadata may include a location. The location in the metadata may be a location at which the remote computing device 100 was located at the time of image capture and it may have been generated based on the location specified by the location subsystem.

Accordingly, the server 160 may receive a location in two different ways: 1) the location may be included in the metadata; and 2) the location may be received apart from the metadata. These two locations should be reflect a common location. The server 160 may evaluate the image data by comparing the location obtained from the location subsystem (i.e., the location that is received apart from the metadata) to the location included in the metadata provided in the image represented by image data. If the two locations correspond, then this evaluation criteria may be said to have been satisfied whereas if they do not then this evaluation criteria may be said to have failed.

A location received from the remote computing device 100 (e.g., a location in metadata provided in an image represented by the image data or a location provided by the remote computing device 100 apart from the metadata) may be compared with a location in the at least one of the profiles (i.e., in the identified profile) to determine whether the location received from the remote computing device 100 sufficiently corresponds to a location associated with the profile. The comparison may consider, for example, whether the two locations are within a threshold distance of one another, whether the two locations are in the same country, whether the two locations are in the same city, whether the two locations are in the same province or state, etc. If the two locations correspond, then this evaluation criteria may be said to have been satisfied whereas if they do not then this evaluation criteria may be said to have failed.

In some embodiments, the image data includes a set of images and server 160 may (at operation 1008) evaluate the image data to determine whether the set of images is complete and generate an error when the set of images is determined to be incomplete. In some embodiments, evaluating the image data may include comparing features of an image of the set to features of another image of the set. For example, the images may be compared to determine whether the colour of the vehicle is the same in each image, whether lighting conditions are the same or similar in each image, etc.

In some embodiments, the remote computing device 100 may be configured to generate a hash chain based on the set of images. The hash chain may be generated by performing a hash on each image in the set and appending the hashes together to form a chain. The hash chain, therefore, includes a hash of a plurality of images in a set and it may be received at the server 160 prior to receipt of the actual images in the set. The hash chain may be used by the server 160 once the images are received to evaluate the image data by determining whether the set of images in the image data is a complete set. For example, a hash of each received image may be obtained and then the hash chain may be recreated by appending the hashes together. The hash chains may be compared to ensure that they correspond. If the two hash chains correspond, then this evaluation criteria may be said to have been satisfied whereas if they do not then this evaluation criteria may be said to have failed.

The hash may, in some embodiments, be generated based on some other data instead of or in addition to the image. For example, location, time, some salt, etc., may be used to generate the hash.

When any evaluation criteria has failed, the image data may be determined to be invalid (at operation 1010). Upon determining that the image data is not valid, the server 160 may generate an error at operation 1014. If, however, all evaluation criteria is satisfied, then the image data may be determined to be valid (at operation 1010) and a photo-based estimation module may be engaged at operation 1012 (using techniques described above). As noted above, the photo-based estimation module may be configured to provide a real-time estimate based on the image data.

In some embodiments, generating an error at operation 1014 may include engaging a manual estimation module. The manual estimation module may, for example, direct a chat interface displayed on the remote computing device to an operator device 150. The operator device allows an operator to engage in a chat via the chat interface. When the image data is valid, the server 160 may engage a chat-bot module that is configured to generate automated replies to input received via a chat interface displayed on the remote computing device.

The server 160 and/or the remote computing device 100 may employ other verification techniques instead of or in addition to those described above. For example, the server 160 may be configured to only accept images captured through an associated submission application. By way of further example, the remote computing device may only allow for "live" captures to be uploaded. That is, it may not permit a saved file to be retrieved and uploaded but may instead require that any upload be based on a newly-obtained image. In some embodiments, the server 160 and the remote computing device 100 may communicate through encrypted communications and the server 160 may only receive images obtained through such encrypted communications. An application that is not configured with appropriate keys will be unable to communicate with the server and, therefore, unable to send images.

In some embodiments, the server 160 may be configured to evaluate a timestamp associated with received image data to determine whether the image was recently captured. The server 160 may only determine that image data is valid if it represents a recently-obtained image. "Recent" may be considered relative to a predetermined threshold.

In some embodiments, the server 160 may be configured to identify an odometer reading in an image and may compare the identified odometer reading to data in an identified profile. For example, mileage may be evaluated relative to known mileage data such as a vehicle's mileage on a previous date, the number of miles typically driven, etc., to determine whether the odometer reading is valid. By way of example, if the odometer reading representing in an image represents a mileage that is less than a mileage logged in the past and stored in the profile, then the image data may be determined to be invalid and an error may be generated.

In some instances, there may be a lag between capture of an image and upload of the image to the server. Such a lag may be caused, for example, because a user may be provided with an opportunity to review the images or because a user may wish to wait to upload the images until they are connected to Wi-Fi. The lag between image capture and image upload may provide an opportunity for tampering in at least some situations. In some embodiments, in order to prevent tampering, a hash, such as an SHA-256 hash may be performed based on image data immediately after the image is taken and may be sent to the server. Later, after the server receives the image, the server may use the hash to confirm that received image is the original image. For example, a hash may be performed based on the received image to ensure that the hash performed on the received image corresponds to the hash performed on the original image. Since metadata may be evaluated by the server, the hash may be performed based on the metadata to ensure that the metadata is not tampered with. The hash may also be performed based on visual data (e.g., the pixels of the image) to ensure that the image itself has not been altered.

The methods described above may be modified and/or operations of such methods combined to provide other methods.

Furthermore, while the description above generally refers to vehicles, any reference to a vehicle could be replaced with other property.

Furthermore, the description above generally describes operations that may be performed by a server and a remote computing device in cooperation with one another. Operations that are described as being performed by the server may, instead, be performed by the remote computing device.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computing device comprising:
   a camera;
   a communications module;
   a processor coupled to the camera and the communications module; and
   a memory coupled to the processor, the memory storing processor-executable instructions which, when executed by the processor, configure the processor to:
      receive, from the camera, a signal comprising image data, the image data representing at least a portion of a vehicle;
      retrieve data representing a preferred scene of the vehicle;
      display an image representing a desired capture area together with a viewfinder representing the image data, wherein the image representing the desired capture area is overlaid on the viewfinder;
      determine, based on the image data and based on the data representing the preferred scene of the vehicle, that the received image data does not correspond to the preferred scene;
      receive, from the camera, the signal including the image data and determine that the image data corresponds to the preferred scene;
      in response to determining that the received image data corresponds to the preferred scene of the vehicle, enable capture of the image data; and
      send, via the communications module, a second signal representing the captured image data to a processing server configured to analyze the captured image data to assess vehicular damage.

2. The computing device of claim 1, wherein the retrieving data representing the preferred scene of the vehicle comprises obtaining the preferred scene of the vehicle based on a policy associated with the vehicle.

3. The computing device of claim 2, wherein the obtaining the preferred scene of the vehicle based on the policy associated with the vehicle comprises:
   sending, via the communications module to the processing server, a third signal representing a credential associated with the policy; and
   receiving, from the processing server via the communications module, a fourth signal including the preferred scene of the vehicle,
   wherein the processing server is configured to use the credential to identify a type of an insured vehicle and to send the preferred scene of the vehicle based on the type of the insured vehicle.

4. The computing device of claim 3, wherein the credential is one or more of:
   a token;
   a policy identifier;
   a user name; and
   a password.

5. The computing device of claim 1, wherein enabling capture of the image comprises:
   enabling a camera shutter button to allow the camera shutter button to be selected to trigger capture.

6. The computing device of claim 1, wherein enabling capture of the image data comprises updating a graphical user interface to indicate that image capture is available.

7. The computing device of claim 1, wherein enabling capture of the image data comprises automatically capturing an image.

8. The computing device of claim 1, wherein the data representing the preferred scene of the vehicle is data representing a base vehicle that is of a same type as the vehicle represented in the image data.

9. A method comprising:
   receiving, from a camera, a signal comprising image data, the image data representing at least a portion of a vehicle;
   retrieving data representing a preferred scene of the vehicle;
   displaying an image representing a desired capture area together with a viewfinder representing the image data, wherein the image representing the desired capture area is overlaid on the viewfinder;
   determining, based on the image data and based on the data representing the preferred scene of the vehicle, that the received image data does not correspond to the preferred scene;
   receive, from the camera, the signal including the image data and determining that the image data corresponds to the preferred scene;
   in response to determining that the received image data corresponds to the preferred scene of the vehicle, enabling capture of the image data; and
   sending, via a communications module, a second signal representing the captured image data to a processing server configured to analyze the captured image data to assess vehicular damage.

10. The method of claim 9, wherein retrieving the preferred scene of the vehicle comprises:
    obtaining the preferred scene of the vehicle based on a policy associated with the vehicle.

11. The method of claim 10, wherein obtaining the preferred scene of the vehicle based on the policy associated with the vehicle comprises:
    sending, via the communications module to the processing server, a third signal representing a credential associated with the policy; and
    receiving, from the processing server via the communications module, a fourth signal including the preferred scene of the vehicle,
    wherein the processing server is configured to use the credential to identify a type of an insured vehicle and to send the preferred scene of the vehicle based on the type of the insured vehicle.

12. The method of claim 11, wherein the credential is one or more of:
    a token;
    a policy identifier;
    a user name; and
    a password.

13. The method of claim 9, wherein enabling capture of the image data comprises:
    enabling a camera shutter button to allow the camera shutter button to be selected to trigger capture.

14. The method of claim 9, wherein enabling capture of the image data comprises updating a graphical user interface to indicate that image capture is available.

* * * * *